(12) United States Patent
Harbusch

(10) Patent No.: US 9,496,575 B2
(45) Date of Patent: Nov. 15, 2016

(54) HUMIDIFICATION UNIT FOR PROVIDING A CARRIER GAS CONTAINING A FUEL, AND FUEL CELL WITH SUCH A HUMIDIFICATION UNIT

(75) Inventor: Volker Harbusch, Munich (DE)

(73) Assignee: Siqens GmbH, Germering (DE)

( * ) Notice: Subject to any disclaimer, the term of this patent is extended or adjusted under 35 U.S.C. 154(b) by 584 days.

(21) Appl. No.: 13/132,726

(22) PCT Filed: Dec. 11, 2009

(86) PCT No.: PCT/EP2009/066995
§ 371 (c)(1),
(2), (4) Date: Aug. 15, 2011

(87) PCT Pub. No.: WO2010/066900
PCT Pub. Date: Jun. 17, 2010

(65) Prior Publication Data
US 2011/0294024 A1    Dec. 1, 2011

(30) Foreign Application Priority Data
Dec. 11, 2008  (DE) .................. 10 2008 061 771

(51) Int. Cl.
| | |
|---|---|
| *H01M 8/04* | (2016.01) |
| *H01M 8/06* | (2016.01) |
| *H01M 8/22* | (2006.01) |
| *H01M 8/10* | (2016.01) |

(52) U.S. Cl.
CPC ....... *H01M 8/1011* (2013.01); *H01M 8/04201* (2013.01); *H01M 8/04261* (2013.01); *H01M 8/04708* (2013.01); *H01M 8/0612* (2013.01); *Y02E 60/523* (2013.01)

(58) Field of Classification Search
USPC .................. 429/408–427, 512–516, 535
See application file for complete search history.

(56) References Cited

U.S. PATENT DOCUMENTS

| | | |
|---|---|---|
| 6,468,683 B1 | 10/2002 | Menzer et al. |
| 6,509,112 B1 | 1/2003 | Luft et al. |

(Continued)

FOREIGN PATENT DOCUMENTS

| | | |
|---|---|---|
| DE | 199 45 667 A1 | 4/2001 |
| DE | 603 07 959 T2 | 1/2007 |

(Continued)

OTHER PUBLICATIONS

Human Translation of Kumatani et al. (JP 63237363, published 10-1988, pp. 1-25).*

(Continued)

*Primary Examiner* — Basia Ridley
*Assistant Examiner* — Caitlin Wilmot
(74) *Attorney, Agent, or Firm* — HoustonHogle LLP

(57) ABSTRACT

The present invention relates to a humidification unit for providing a carrier gas containing a fuel for supplying a fuel cell. This comprises a humidification chamber, which is designed for the storage of a liquid containing fuel, an inlet leading into the humidification chamber feed a liquid containing fuel, a further inlet leading into the humidification chamber to feed a carrier gas, in such a way that the carrier gas in the humidification chamber is in contact with the liquid, an outlet for the release of the carrier gas containing gaseous fuel, wherein a control unit is provided to keep the liquid containing fuel in the humidification chamber at a temperature below its boiling point.

14 Claims, 6 Drawing Sheets

(56) References Cited

U.S. PATENT DOCUMENTS

Figure 1:
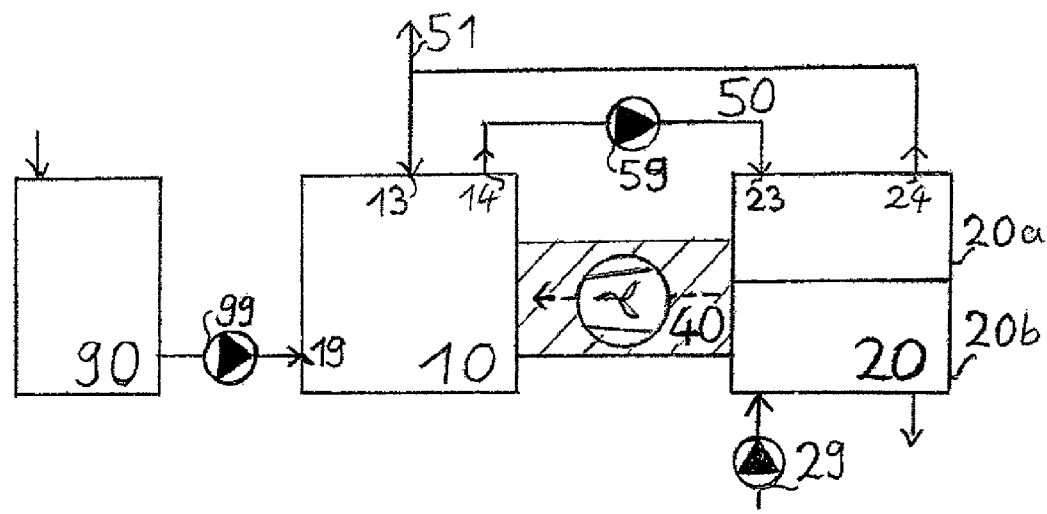

| | | |
|---|---|---|
| 7,358,002 B2 | 4/2008 | Kanai et al. |
| 7,572,323 B2 | 8/2009 | Muller et al. |
| 2002/0132145 A1 | 9/2002 | Preidel |
| 2009/0253001 A1* | 10/2009 | Ito ................................. 429/17 |

FOREIGN PATENT DOCUMENTS

| | | |
|---|---|---|
| DE | 10 2007 019 360 A1 | 10/2008 |
| EP | 1 050 086 B1 | 4/2002 |
| EP | 1 383 191 A1 | 1/2004 |
| JP | 63 237363 A | 10/1988 |
| WO | 97/50140 A1 | 12/1997 |
| WO | 2006/010012 A2 | 1/2006 |

OTHER PUBLICATIONS

International Search Report, mailed Mar. 16, 2010, from Counterpart International Application No. PCT/EP2009/066995, filed on Dec. 11, 2009.

International Preliminary Report on Patentability, dated Jun. 14, 2011, from Counterpart International Application No. PCT/EP2009/066995, filed on Dec. 11, 2009.

* cited by examiner

HUMIDIFICATION UNIT FOR PROVIDING A CARRIER GAS CONTAINING A FUEL, AND FUEL CELL WITH SUCH A HUMIDIFICATION UNIT

The present invention relates to a humidification unit for providing a carrier gas containing a fuel for supplying a fuel cell. The present invention also relates to a fuel cell with such a humidification unit.

EP 1 383 191 A1 discloses a direct methanol fuel cell (DMFC) with a fluid separating device. The purpose of this device is to separate $CO_2$ from the fluid of the anode outlet, while keeping the losses of methanol as low as possible. This fluid separating device has an upper and a lower chamber, separated from one another by a sponge-like separating object.

EP 1 050 086 B1 describe a process and a device for the operation of a direct methanol fuel cell. According to this process, it is proposed that $CO_2$ be used as carrier gas.

Described in DE 603 07 959 T2 is a hydrogen fuel cell with an exhaust gas treatment unit. In the exhaust gas treatment unit, the hydrogen gas discharged from the fuel cell is mixed with cathode exhaust gas, in order to dilute the hydrogen gas before it is released into the atmosphere. The fuel cell has a humidifier to humidify the hydrogen and the air which are fed into a fuel cell stack.

Described in DE 10 2007 019 360 A1 is a reformer for supplying a fuel cell system. The reformer produces a hydrogen-rich fuel gas, in particular hydrogen, from a liquid fuel e.g. methanol and an oxidant gas e.g. air.

Fuel cell systems which are operated with carbonaceous fuels use a reformer to produce a hydrogen-rich gas (reformate gas). They differ in particular in whether, in the reformer, a partial oxidation of carbon takes place with separation of hydrogen by means of sub-stoichiometric addition of oxygen, or else a hydrogen-rich gas is produced through steam reformation involving the provision of water. Depending on its composition, in particular carbon monoxide concentration, such reformate gas may be fed to a low- or high-temperature PEMFC (proton exchange membrane fuel cell), an SOFC (solid oxide fuel cell), a molten carbonate or an alkaline fuel cell. In order to increase the quality of the reformate gas, in particular to remove the carbon monoxide concentrations and other impurities, it is possible to after-treat the reformate gas in one or more catalytic process stages, such as high and low temperature shift stages or purification stages. Hydrogen can however also be extracted from the reformate gas by means of a hydrogen-permeable membrane (for example from a palladium-copper alloy).

WO 97/501/40 discloses a direct methanol fuel cell (DMFC) with an evaporator. In the evaporator, the two components of the fuel solution, water and methanol, are heated above boiling point and then fed into the fuel cell. Via a control mechanism, which compares the load-based specified value for water-methanol concentration with the actual value of the mixture in the pipe, two dosing pumps are set for the supply of water and methanol. A methanol sensor is provided to measure the actual value. The $CO_2$ produced in the anode circulation is separated from the exhaust gas by a $CO_2$ separator. The fuel contained therein is then available in condensed form and may circulated, i.e. fed into the evaporator. A portion of the separated $CO_2$ may also be circulated.

There are known fuel cells, such as the DMFC, which are operated with fuel solution. The use of a liquid fuel is advantageous, since it may be supplied easily with high energy density. However, the operating temperature of such fuel cells is limited, which is disadvantageous for their efficiency.

Direct methanol fuel cells with gaseous fuel supply, in contrast to those supplied with liquid fuel, are not limited in their operating temperature, so that greater efficiency per unit area of the anode may be obtained. The gaseous supply of the anode also allows operation at higher temperatures for example in excess of 100° C. If higher temperatures can be reached in the electrodes of the fuel cell, a direct conversion of polyvalent hydrocarbons such as ethanol to electricity is easier to achieve. Higher temperatures are especially advantageous because they enable a higher power density and a greater efficiency of the fuel cell.

Nowadays fuel cells which are operated with a carbon-containing fuel can be designed only with a high technical input, relating to the supply of an appropriate anode fluid. The fuel concentration in the carrier gas (i.e. the working or carrier medium) must on the one hand meet the requirements for adequate supply but on the other hand must not be too high, since too high a concentration of fuel can lead to a break-through of fuel through the electrolytes. In the case of a gaseous supply of the anode which is positioned on a customary polymer electrolyte, e.g. Nafion®, a much greater amount of is required than is consumed for the anode reaction ($CH_3OH + H_2O \rightarrow CO_2 + 6H^+ + 6e^-$), in order to keep down the crossover of methanol and achieve a humidification of the membrane.

The currently known method for supplying fuel cells which convert directly to electricity with evaporated fuel normally requires more pipes which to some extent need extra heating and insulation, plus extra circuits for heating the evaporator. The disadvantage of complete evaporation of a fuel solution is also the production of combustible gases under pressure which in turn requires adequate safety engineering. These disadvantages are major factors impeding the commercial use of DMFCs with a gaseous anode fluid.

The problem of the present invention is therefore to provide means and a process which permit very simple, efficient and cost-effective operation of a fuel cell.

The problem is solved by a humidification unit to supply carrier gas containing fuel to feed a fuel cell, a fuel cell system and a process for the provision of a carrier gas containing fuel in which, in a humidification unit which is partly filled with a fuel-containing liquid. The humidification unit comprises a humidification chamber, which is designed for the storage of a liquid containing fuel, an inlet leading into the humidification chamber to feed a liquid containing fuel, a further inlet leading into the humidification chamber to feed a carrier gas, in such a way that the carrier gas in the humidification chamber is in contact with the liquid, an outlet for the release of the carrier gas containing gaseous fuel, wherein a control unit is provided to keep the liquid containing fuel in the humidification chamber at a temperature below its boiling point. A fuel cell unit with the humidification unit described above comprises a fuel cell with an inlet for the feeding of carrier gas enriched with fuel, and an outlet for the discharge of fuel-depleted carrier gas, wherein the outlet is connected directly to the inlet for supplying the carrier gas to the humidification unit. In the process, a humidification unit is partly filled with a fuel-containing liquid, the fuel-containing liquid being held at a temperature below its boiling point. The carrier gas in the humidification chamber is brought into contact with the liquid, by which means the carrier gas is enriched with the fuel, and the carrier gas enriched with fuel is made available.

According to a first aspect of the present invention, a humidification unit is provided to supply carrier gas containing fuel to feed a fuel cell. This comprises:

a humidification chamber, which is designed for the storage of a liquid containing fuel, an inlet leading into the humidification chamber to feed a liquid containing fuel, a further inlet leading into the humidification chamber to feed a carrier gas, in such a way that the carrier gas in the humidification chamber is in contact with the liquid, an outlet for the release of the carrier gas containing gaseous fuel, wherein a control unit is provided to keep the liquid containing fuel in the humidification chamber at a temperature below its boiling point.

In the present invention, the liquid in the humidification unit is set at a temperature below its boiling point. Because of this, a portion of the liquid passes into the gaseous phase through humidification and not through evaporation, and becomes a constituent part of the carrier gas. Evaporation is understood to mean the heating of a liquid above its boiling point. In comparison with evaporation, the amount of liquid (fuel and/or water) taken up through humidification, per unit of time and relative to the volume of the carrier gas, is less. This disadvantage is however accepted, since the degree of humidification depends very strongly on the saturation level of the respective liquid components of the carrier gas. If the carrier gas is circulated from the humidification unit to the fuel cell the fraction of the fuel in the carrier gas depends on the load state of the fuel cell. At a low load the depleted carrier gas contains more fuel and at a high load less fuel. Through humidification in the humidification unit, without additional control mechanisms, a carrier gas with a low fuel content absorbs more fuel than a carrier gas with a high fuel content.

By this means, precise dosing of the fuel may be effected very easily. It has also been found that the flow rate of the carrier gas may be set so that the fuel cell is adequately supplied with fuel. Consequently, the transfer of the fuel by means of humidification is not disadvantageous to evaporation, but instead has considerable benefits in respect of dosing.

The circulation of the carrier gas between a humidification unit and a fuel cell, without condensing the fuel from the carrier gas depleted by the fuel cell, may also be used in an arrangement with an evaporator instead of a humidification unit. For dosing, state of the art means (see e.g. WO 97/50140), in particular sensors for fuel in the enriched carrier gas, must then be used. Through the direct feeding of the depleted carrier gas to the evaporator, the remaining fuel in the carrier gas is fed directly to the evaporator and therefore the whole arrangement is simplified and losses from additional condensation are diminished. Alternatively the depleted carrier gas can be mixed without further treatment with the gas containing fuel leaving the evaporator, and fed to the fuel cell. The circulating of the carrier gas, in particular direct from the fuel cell to the evaporator or the humidification unit represents an independent inventive concept.

The concentration of the fuel in the carrier gas before the inflow into the anode of the fuel cell can be controlled easily and exactly, and easily maintained, by controlling the temperature and/or concentration of the liquid containing the fuel and/or of the humidification chamber.

The control unit may be an electronic or mechanical device.

The device according to the invention is described below for the most part taking a DMFC as an example. It is however also possible to use fuels other than methanol. Where reference is made to methanol, in principle other fuels may be provided.

To avoid a reduction in concentration in the carrier gas, the methanol should always be dosed at a slightly higher level than necessary. At too high fuel concentrations methanol breaks through and can escape through the exhaust outlet. In this connection, the use of a catalytic burner exhaust gas cleaning may be advantageous.

According to the present invention, it is in principle possible to dispense with a methanol sensor. According to one embodiment of the present invention, a sensor may be provided to measure the concentration in the humidification chamber of the liquid containing fuel. In principle, though, this is not necessary. With the aid of information from the sensor, more exact fuel dosing is possible, which would reduce losses. Such a concentration measurement in the liquid is technically much easier to realise than a concentration measurement in the hot gaseous phase.

With the device according to the invention, the fuel concentration in the carrier gas can be kept low and the water concentration can be kept high without complex and expensive condensation devices such as fuel- and/or water separators. This is advantageous in particular for the operation of fuel cells with a high demand for water for humidification but which tolerate only little methanol, since otherwise too much methanol would cross over through the membrane without conversion to electricity.

It is also advantageous that the carrier gas need not be brought to overpressure, so that the components which this would require may also be dispensed with.

In the humidification chamber there is a minimum amount of the liquid containing fuel. This is large enough to keep to a minimum the fluctuations in concentration caused by pulsating fuel feeding, i.e. the variation in concentration of the fuel-containing liquid is for example less than 5-10%. This makes it possible to use pumps which are convenient for feeding such as conventional membrane, gear or piston pumps.

The invention therefore makes it possible to use for gaseous operation the benefits given by an operating reservoir with a liquid fuel solution in the anode circulation, in particular the easily realised and low-cost dosing of fuel. Risks arising from the production of an evaporated fuel will also be reduced.

On account of a preset operating temperature, the concentration of a fuel-enriched carrier gas in the humidification unit will be nearly self adjusting because of the saturation and vapour pressure curve of the carrier gas. The vapour pressure equilibrium depends on the concentration of the liquid containing fuel, and the temperature in the humidification unit. Thus the concentration of the gaseous fuel and water in the supply fluid for the anode and in the enriched carrier gas respectively may be adjusted via temperature and the fuel concentration of the aqueous solution.

It is furthermore possible to operate a fuel cell with a higher temperature than a normally operated fuel cell with liquid fuel supply, leading to greater efficiency.

The fuel may be stored safely and with high energy density in liquid form.

The construction of the device according to the invention is simple, since the fuel does not need to be heated above its boiling point.

Furthermore, there is no need for expensive and energy consuming heat exchangers and/or condensers to separate water, fuel and $CO_2$ after the outlet from the anode.

With the present invention there is no need for energy to heat fuel and/or water above the boiling point. The heating equipment is preferably supplied with energy from the waste heat of the fuel cell.

The fuel concentration of the carrier gas can be easily and reliably adjusted without expensive methanol sensors and control mechanisms.

According to a second aspect of the device according to the invention, a fuel cell unit is provided with a humidification unit. This fuel cell unit includes a fuel cell with an inlet for feeding with fuel-enriched carrier gas and an outlet for discharging fuel-depleted carrier gas. The outlet is connected directly to the inlet to supply the carrier gas of the humidification unit.

According to the second aspect of the present invention, at least one partial flow of the depleted carrier gas may be fed back directly to the fuel cell. According to the prior art, fuel vapour and water vapour are completely condensed out of a carrier gas with the aid of one or more condensers, after passing the anode chamber, and are therefore entirely separated from the carbon dioxide phase. This process requires suitably designed condensers and heat exchangers. According to the present invention these condensers and heat exchangers are not essential, as the depleted carrier gas may be fed directly into the humidification unit.

A device for the conditioning or cleaning of the fuel solution may be integrated in the humidification unit.

In a humidification unit which is partly filled with a carrier gas containing fuel, according to a process according to the invention for the provision of a carrier gas containing fuel, the liquid containing fuel is held at a temperature below its boiling point, and the carrier gas in the humidification chamber is brought into contact with the liquid, causing the carrier gas to be enriched by the fuel, and the carrier gas enriched with fuel is made available.

According to another aspect of the process according to the invention for the supplying of a fuel cell with a carrier gas containing fuel, using a process for the provision of a carrier gas containing fuel, the carrier gas containing gaseous fuel is fed to the fuel cell, and at least a portion of the carrier gas (after being depleted in the fuel cell) is fed directly from the fuel cell into the humidification unit as carrier gas, so that the carrier gas containing fuel is circulated between the fuel cell and the humidification unit.

Because of the chemical reactions taking place in the fuel cell, the amount of gas decreases somewhat and not all the depleted carrier gas can be circulated. A small amount is removed and subjected to treatment to separate the fuel contained therein from the carrier gas. This can be done for example by washing as explained in detail below. As only a small volume flow has to be treated, the separation devices can be correspondingly small.

According to another aspect of the process according to the invention, the exhaust gas of the cathode is divided into two partial flows. One part of the flow leaves the system uncooled and the other part is cooled by a heat exchanger. The condensate produced by cooling of this other partial flow is fed directly into the humidification unit or collected in a separate chamber within the humidification unit.

This aspect of the process according to the invention is an independent inventive concept, which is generally applicable to different types of fuel cell.

According to another aspect of the process of the invention for the supply of a fuel cell with a liquid containing gaseous fuel, the fluid is carried in a circulation between the fuel cell and a humidification unit, which is partially filled with a liquid containing fuel. In the course of this, the gaseous fluid is brought into contact with the liquid containing fuel via means for enriching the gaseous fluid.

Other advantageous variants of the process according to the invention are given below.

Gaseous fluid may be extracted from the humidification unit, with the gaseous fluid being mixed with air and fed into a catalytic burner or a fuel cell anode or a fuel cell cathode. In the process, air may be admitted into the humidification chamber.

The gaseous fluid may also, through feeding into the liquid containing fuel, be brought into contact with the latter via means for enriching with vapours or fuel, such as humidifying bodies.

The gaseous fluid may be brought into contact with the liquid containing fuel via an arrangement for enriching the carrier gas, such as e.g. one or more humidifying bodies.

Control of the proportions of the two separated exhaust flows of the cathode may be effected on the basis of a measuring signal from a level sensor in the humidification unit or in the condensate collection chamber.

On the anode side of the fuel cell there can be an overpressure of below 1500 mbar, in particular less than 1000 mbar and preferably less than 800 mbar. In the humidification unit there can be a low pressure of 100 mbar or less and an overpressure of at most 1000 mbar compared to the ambient pressure.

The fluid may contain water vapour, with regulation of the vapour pressures of fuel and water vapour being effected through adjustment of the fuel concentration and the temperature of the fuel solution.

Control of the amount of fuel metered from a fuel tank into the humidification unit or of the fuel concentration of the liquid containing fuel may be effected on the basis of at least one of the following parameters: the temperature of the liquid containing fuel, a control variable which may be derived from the current intensity of the fuel cell stack, the temperature of the fuel cell or the fuel cell stack, the filling level of the liquid containing fuel, or the fuel concentration of the liquid containing fuel.

The above process according to the invention may also be described by saying that the fuel cell of the fuel cell unit has an anode, a cathode and an electrolyte system. In the process, a fuel-enriched carrier gas containing $CO_2$, fuel vapour and water vapour and having a temperature below the boiling point of the fuel or an aqueous solution of the fuel, is fed to an anode side of the fuel cell. This process may be used for different types of PEMFC. The electrolyte can be adapted according to fuel cell type, fuel type and operating temperature. Suitable for low and medium temperature PEMFCs (40-130° C. operating temperature), for example, are fluorinated polymers with sulphonic acid groups, sulphonated polycarbonate/hydrocarbon systems, plus polyetheretherketone (PEEK) with sulphonic acid groups. Furthermore this process can also be used in high temperature systems with a solid oxide fuel cell (SOFC) or a molten carbonate fuel cell (MCFC).

With the possibility of simpler and energy-saving production of a suitable gaseous anode fluid, a cost-effective use of fuel cells converting directly to electricity or of fuel cell systems with reformer can be achieved. This also applies in particular to fuel cells with an electrolyte which, on the basis of phosphoric acid, is ion-conductive, as these generally cannot be operated with liquid methanol solution or other fuel solutions, since the phosphoric acid will be dissolved out of the carrier matrix on contact with liquid water or fuel solutions.

Generally the invention serves to realise the operating of fuel cells with gaseous reactants, thereby enabling more efficient conversion to electricity of organic fuels by means of higher fuel cell operating temperatures with a low cost of components. The disadvantages of fuel cells with liquid anode fluid, such as the two-phase flow in the supply or feed chambers of the electrodes and the high water diffusion to the cathode, can be also avoided by means of the gaseous anode feed facilitated according to the invention.

In the following, the term "fuel cell" covers both two-dimensional and three-dimensional fuel cells, i.e. flat cells and so-called fuel cell stacks.

One design of the fuel cell unit according to the invention has the following characteristics: a fuel cell with an anode side and a cathode side, a humidification unit which bounds a humidification chamber with fuel solution, with an inlet for the fuel-containing liquid and an inlet and an outlet for a gaseous fluid, together with a pipe which connects the inlet of the humidification unit with the anode side of the fuel cell, and a pipe which connects the outlet of the humidification unit with the anode side of the fuel cell, wherein a conveyor is provided which is designed to circulate the gaseous fluid between the anode side of the fuel cell and the humidification unit.

Also provided is a control device which is so designed for the regulation of the operating parameters of the humidification unit that the fuel-containing liquid in the humidification chamber is kept in the liquid state at a suitable temperature. In addition there are means for the enrichment of the gaseous fluid by fuel contained in the liquid.

The core piece of the fuel cell unit according to the invention is the humidification unit, which delimits a humidification chamber which is designed to be filled up to a certain level with a liquid containing fuel. The operating parameters inside the humidification unit, like pressure and temperature, should be controlled so as to maintain a suitable vapour pressure above the liquid. At the same time, the boiling point of the fuel-containing liquid should not be exceeded and moreover the liquid should not evaporate completely. This can be done not only by a control unit but also using a feedback control, which will be described more precisely in the typical embodiments. In this way the carrier gas or the gaseous fluid, which forms an anode fluid, can be enriched with fuel via the fuel-containing liquid which may be fed to the anode for fuel supply. Thus an anode fluid circulation is created.

Carbon dioxide is normally produced by the anode reaction, if methanol or other carbon-containing fuels are oxidised directly at the anode. The carbon dioxide which is inert with respect to the anode reaction is suitable as carrier gas for the required amount of fuel- and water vapour. An appropriate anode fluid for a gaseous direct-methanol fuel cell is a mixture of carbon dioxide, water vapour and methanol vapour in which during operation fairly small amounts of other intermediate reaction products of the methanol oxidation together with inert gases will be found in the anode fluid.

The anode fluid is circulated and enriched with the vapour of the aqueous fuel solution in the humidification unit. The humidification unit is in the circulation of the anode flow, that means it is integrated in this circulation. Therefore an inlet and an outlet are provided for the anode fluid. Into the inlet flows that anode fluid which, after passing the anode chamber of the fuel cell, has not been ejected but remains in the anode circulation. Through the outlet, the anode fluid once more enriched by vapours of the fuel solution flows to the anode of the fuel cell.

When a reformer is used, the fuel-enriched carrier gas is fed into a reformer chamber instead of into the anode chamber.

The enrichment proceeds in the humidification unit by using a reservoir with fuel solution, described below as the operating reservoir. In the operating reservoir there is a minimum amount of fuel solution, which is large enough that even with a pulsating fuel feed the concentration fluctuations will be low, for example less than 5-8%.

The enrichment of the carrier gas in the humidification unit is based upon the principle of humidification. Humidifying means in the context of this description of the invention an enrichment of a gas with particles of a fluid transferred in the gas phase and with a temperature below the boiling point. The carrier gas is humidified with water vapour and fuel from a liquid containing fuel.

The enrichment of the gaseous fluid or the carrier gas can proceed in several ways. According to one design, the device for the enrichment of the carrier gas or the medium for the enrichment of the gaseous fluid may have a pipe, which elongates the inlet towards the bottom of the humidification unit and which has in an end section at a distance from the inlet of the humidification unit a number of openings for the discharge of the gaseous fluid from the pipe into the liquid. In other words the pipe extends into the humidifying chamber bounded by the humidification unit so that one end of the pipe, which is provided with one or more openings, dips into the liquid containing fuel which is present in the humidification chamber. I.e. the end section of the pipe provided with a number of openings is near to the bottom of the humidification unit, where it is covered by the liquid containing fuel. According to a simple layout of this design the pipe can also be replaced by providing the inlet for the gaseous fluid in the area of the humidification unit near to the bottom, which is covered by the liquid containing fuel during operation.

The gaseous fluid of the anode fluid circulation enters through the one or more openings into the liquid-filled area of the humidification chamber and bubbles up through the liquid, thereby enriched with fuel. Afterwards the fluid enriched in this way leaves the humidification unit by the outlet and can be fed the anode of the fuel cell.

The diameter of the one or more openings may for example lie in the range between 0.05 and 5.0 mm. The smallness of the openings produces bubbles which are also small in diameter, so that the ratio of surface to volume which is important for the absorption of the fuel is advantageous. Of course the openings may also be made larger or smaller depending on the conditions of use. It may be advantageous if the diameter of the openings is adjustable.

According to an alternative embodiment the fuel enrichment of the gaseous fuel in the humidification chamber is effected with the aid of solid bodies which bring the fuel-containing liquid and the gaseous fluid into contact. For this purpose the means for the enrichment of the gaseous fluid have at least one humidification body which is designed to be in contact with the fuel-containing liquid and extends with one part of its surface out of the liquid. In other words the at least one humidification body is arranged in the humidification chamber, so that a part of it is in an area covered with liquid during operation (e.g. an area near to the bottom) and another part is in an area of the humidification chamber which is designed not to be covered by liquid during operation. The humidification body thus extends the contact surface between the gaseous fluid and the fuel-containing liquid in the humidification unit.

For this purpose the humidification body may be designed to convey the fuel-containing liquid to the surface area by capillary attraction and/or hydrophilic means. The humidification body may therefore be designed for example as a porous body. To increase the contact surface, several bodies may also be used.

Other types of humidification can be realized with the aid of a device for feeding the fuel solution into the upper part of the humidification chamber, e.g. a pump. In one possible design, fuel solution is bubbled or sprayed into the gas chamber with the aid of a suitable device or a sprinkler, for example a jet. This process provides the liquid with a high surface which is appropriate for high humidification rates. Through the contact of the droplets with the depleted gaseous anode fluid which is flowing through the humidification unit, the anode fluid is humidified and by this means is once again enriched with fuel and water.

Another embodiment makes use of porous bodies. One or more of these bodies are humidified from above. The gaseous anode fluid is conducted through the humidified body and absorbs fuel vapour. For this purpose another conveyor may be necessary, which is designed to convey fuel solution on to or through the humidification body. It is advantageous if the flow path of the fuel solution in the porous body is contrary to the flow of the anode gas.

According to special embodiments of the invention a device may be provided for the washing out or the condensing of fuel from the excess gaseous fluid or the depleted carrier gas. This excess fluid is that amount of gas (normally carbon dioxide) produced additionally by the fuel cell and no longer needed for fuel transportation in the anode circulation. For the washing out, a liquid such as water is used, and this may be the water able to condense from the cathode during operation of the fuel cell. According to the embodiments described below, the washing out can take place directly in a separate area of the humidification unit. According to an alternative embodiment the washing out can of course also take place in a unit separate from the humidification unit. The washing out serves to recycle the fuel contained in the excess fluid of the anode circulation back into the anode circulation and to separate the fuel-free or low-fuel grade excess fluid.

In one embodiment there is a separate chamber within the humidification unit for the washing of the excess fluid. This chamber delimits a condensate catchment space and has another inlet for a gaseous fluid, a further inlet for a liquid, and an exhaust outlet. Through the further inlet for a gaseous fluid, the excess anode fluid is fed into the chamber for washing. The other inlet for a liquid serves for the feed of washing liquid and, through the exhaust gas outlet, the depleted excess anode fluid will be discharged to the outside.

The condensate catchment space can be connected to the humidification chamber by a channel, a bezel or a valve with a diameter between 0.05 to 4.0 mm. The narrowness of the channel prevents the fuel-containing liquid from entering the separate chamber from the humidification chamber.

The separate chamber or the condensate catchment chamber may also be connected to the humidification chamber by an overflow pipe or a siphon. Preferably the separate chamber can be insulated from the rest of the humidification unit. By this means is ensured that the optimal operating conditions for the washing out of the excess fuel on the one hand, and the enrichment of the gaseous fluid with fuel on the other hand, may be set independently of one another.

The humidification unit may also be divided into several chambers.

In order to convey humidified fuel from a fuel store in the humidification unit, with a constant power drain from the fuel cell or constant fuel consumption, it is necessary for a fuel store to resupply the humidification unit with exactly the same amount as that consumed. For the purpose of supplying fuel, a precise means of delivery or pump should be used. The ideal of a reproducible and therefore adjustable delivery rate is achievable with pumps with a defined delivery volume or a constant feed rate per pump cycle or per turn of the drive motor, such as small piston pumps, diaphragm pumps or gear pumps.

Through the operating reservoir, which contains an appropriate amount of methanol solution, a discontinuous addition of methanol is buffered. For example a given system with a fuel cell output of 250 watts and an operating reservoir with a volume of 500 ml could be dosed discontinuously with 1.44 ml methanol every 30 seconds so that, with a volumetric average concentration of 25% methanol, the fluctuations in concentration in the anode fluid are below 4%. For continuous dosing (evaporator principle), on the other hand, an amount or flow rate of about 0.048 ml methanol per second would need to be fed to an evaporator, which demands more precise and significantly more complex pumps.

To avoid inaccurate dosing it is expedient to keep the fuel in the feed line to the dosing mechanism free of bubbles. Appropriate bubble separators can be used for this purpose. For degassing the bubble separator there may be a connection between the latter and the humidification unit. Some pumps, due to their delivery rate, are prone to vibration or influence their natural vibration, so that a mechanical decoupling of the pump in respect of vibration is often advantageous.

According to a process according to the invention for the feeding of a fuel cell with a fluid containing gaseous fuel, the fluid is circulated between the fuel cell and a humidification unit which is partially filled with a liquid containing fuel, wherein the gaseous fluid is brought into contact with the fuel-containing liquid via means for the enrichment of the gaseous fluid. This bringing into contact of the gaseous fluid may be effected by feeding it into the fuel-containing liquid. According to an alternative, the gaseous fluid is brought into contact with the fuel-containing liquid via one or more humidifying bodies.

The invention will be explained below substantially by the example of a direct-methanol fuel cell unit, in which of course instead of methanol other carbon-containing fuels or fuel mixtures such as for example ethanol or carboxylic acid may also be used.

In the direct-methanol fuel cell, methanol is oxidised to $CO_2$ at the anode with oxygen which is produced from water with the catalyst ruthenium via OH ions. At the anode catalyst, fuel and water are consumed and free protons, electrons and the reaction product $CO_2$ are produced. The generated protons reach the cathode via the electrolyte.

Electrolytes which, on account of sulphonic acid groups, are proton-conductive, have satisfactory conductivity for the purposes of the fuel cell only after adequate humidification. Water is therefore advisable in the anode fluid, i.e. the gaseous fluid which is fed to the anode of the fuel cell for the fuel supply, mainly for the humidification of the electrolyte in addition to its function as reactant.

As described, the process of humidification may take different forms. With the principle of humidification through feeding the anode fluid in the form of gas bubbles into the fuel solution, the humidification level and the pressure in the anode chamber may be adjusted above all via the temperature of the fuel solution, but also by the size of the outlet openings, their number, and the depth of insertion into the fuel solution. Correspondingly these operating parameters may be used to control or regulate the process.

Another form of humidification is based as described on the humidifying of fuel and water, which is enabled by the contact of the carrier gas with an enlarged surface of the fuel solution. For this purpose, bodies made of materials such as fabrics, polymer foams or porous ceramics (for example melamine foam, polyurethane foam, silicon carbide ceramics or metal oxide ceramics), which are easily wetted with the fuel solution, are used. However, hydrophilic membranes may also be used. The humidification bodies are partly in the liquid phase of the fuel solution but also in the gas phase. The moisture level of the operating gas can be adjusted via the temperature, the inflow surface, the material of the humidification bodies and the contact time of the carrier gas with the moist surface.

The humidification bodies can be arranged in a way that, depending on the fill level in the humidification chamber, they are humidified and/or that at lower fill levels they have no contact with the liquid. In this way, the humidification level of the operating gas is controlled automatically via the fill level of the operating reservoir. This self-regulating humidification leads at low fuel fill levels to a decrease in the water partial pressure in the anode fluid and at the anode. This increases the diffusion of the product water from the cathode to the anode, or rather decreases the diffusion from the anode to the cathode. The reduced water partial pressure at the inlet of the anode chamber leads with the appropriate electrolytes to an increase in the water partial pressure in the anode fluid through absorption of product water, while it flows through the anode chamber, or at least leads to decreased water due to reduced water discharge via the cathode fluid. If the water partial pressure in the anode fluid is increased, then water can be fed back to the operating reservoir, since it re-condenses in the cooler humidification chamber. Normally, however, the humidification level of the carrier gas is at 100% relative humidity after it has left the humidification chamber.

The anode fluid is heated in the anode chamber to the operating temperature of the fuel cell. Upstream heating of the enriched anode fluid is also possible with a heat exchanger which is supplied with heat from the fuel cell stack. The temperature of the anode fluid in the fuel cell is normally much higher than in the humidification unit. After leaving the fuel cell, the anode fluid or carrier gas is cooled in the humidification unit. A cooling of the carrier gas before the inflow into the humidification unit is possible with an upstream heat exchanger or a cooling unit.

Whether or not the humidification unit has to be cooled because of the heat quantity input from the anode fluid, or has to be heated because of the evaporation heat which is extracted for the humidification, depends on the temperature difference between humidification unit and fuel cell. This temperature difference is determined essentially from the fuel cell type, i.e. in particular on whether a low-, medium- or high temperature fuel cell is used and by the level of the operating temperature set in the humidification unit. Other factors and values also play a role, such as the type of fuel, the volume flows and composition of the anode fluid or the supply lambda (the stoichiometric multiple of the consumed fuel) of the anode with fuel and water, diffusion of fuel and water through the electrolytes and the emission of heat from the humidification unit into the surroundings. For example a fuel cell with an anode fluid with a supply lambda of three and a methanol concentration of 10% (amount of particles) and an electrolyte with a methanol crossover which may be disregarded but a water crossover corresponding roughly to water consumption, needs a temperature difference between fuel cell and humidification chamber significantly higher than 100° C., to achieve heating of the humidification chamber from inflowing anode exhaust gas. Without extraction of water from the anode fluid due to diffusion through the electrolyte, the temperature difference would still need to be about 70° C. if the heat radiation of the humidification unit is too low. For heating and/or cooling of the humidification chamber and of the fuel-containing liquid, an appropriate tempering device may be used.

To prevent energy loss, i.e. the cooling of the fuel solution through the evaporation of water vapour and fuel vapour, a heat input into the humidification unit is generally expedient for fuel cells with an operating temperature below 130° C. For this, the waste heat of the fuel cell of the fuel cell unit according to the invention can be used.

A device for heat exchange between the fuel cell and the humidification unit is preferably provided for this purpose.

The heat exchanger unit is controlled by the controller of the fuel cell unit, so that the heat exchange is reduced or interrupted if the temperature in the humidification unit becomes too high, and the heat exchange (i.e. the heat input from the fuel cell to the humidification unit) is increased if the temperature in the humidification unit becomes too low. Furthermore, of course, an additional heat source such as a reformer or an electrical load may be used, and an external heat source can be used if needed.

The heat exchange device may be placed between fuel cell and humidification unit and controlled by the control unit. The heat exchange device can include a fan or a blower. The heat exchange device may include bodies which protrude into the humidification chamber.

The layout or the form of the heat exchange bodies in the humidification unit can be designed for self regulation of the fill level in the humidification chamber.

To enable heat input by means of heat conduction, the humidification unit includes one or more suitable thermal connections with the fuel cell stack. The thermal connection is designed to keep the temperature differences due to heat dissipation within the stack as small as possible. This is achieved by taking heat from the stack at several points, for example at both end plates, and at one or more heat dissipation sources within the stack. If using waste heat from electrical loads like pumps, the heat can also be dissipated by thermal bridges.

The thermal bridges can be so designed that they are connected to one another at the hot side, and divide at the side of the heat outlet. The thermal bridges can also be heated with a hot air flow instead of thermal connection to the fuel cell or the stack.

In the case of this second option for heat transfer to the humidification unit, heat can be supplied by cooling air from the stack or electrical loads of the fuel cell unit. In this embodiment the heated air releases energy directly to the humidification unit. This happens with the help of the regulation of the air volume flow via the temperature of the operating reservoir or another control variable. For example an adjustable fan can be used for the air flow. This flow transfers the air heated by the waste heat of the fuel cell or the stack to suitable heat exchanger surfaces of the humidification unit.

Such a controlled heating of the humidification unit is also applicable for fuel cell cooling through an extra cooling circuit using a cooling fluid. Here a controllable partial flow from the cooling circuit is branched off and fed to suitable heat exchanger surfaces of the humidification unit. Thus a regulated heat dissipation to the operating reservoir can once again take place.

Heat transfer by both of the principles described (heat conduction and heating with a heated coolant) can also happen simultaneously. Moreover, extra cooling may be provided by outside air, when rapid cooling down of the operating reservoir is appropriate.

The thermal connection can also be made with other suitable constructions, like a matching spatial layout or combination of system components and/or fuel cell and humidification unit.

For fuel cells with a high operating temperature, as for example the solid-oxide fuel cell (SOFC), cooling is necessary otherwise the humidification unit would overheat and the appropriate operating temperature or the boiling point of the fuel-containing liquid would be exceeded. With these fuel cell systems a heating of the anode fluid unit via an extra heat input is not appropriate, because the heat energy of the outflowing anode fluid is greater than the heat of energy which is needed in the humidification unit to enrich depleted vapours.

If the operating temperature range of fuel cell and humidification unit is suitable, then there is no need for the heat transfer by means of a regulated heat flow or for a regulated cooling by means of a cooling air flow, and instead the energy required is fed into the humidification unit via the anode exhaust gas temperature, i.e. the heat of the depleted carrier gas which has approximately the temperature of the fuel cell. This design needs no additional temperature control devices to control the humidification temperature of the anode fluid unit.

The composition of the methanol and water vapour enriched carrier gas (carbon dioxide) depends on the molar composition of the fuel solution and its temperature. The partial pressures of the vapour phases correspond to the vapour equilibrium over a multi-component mixture or an aqueous fuel solution.

With a variable and regulated operating temperature of the humidification unit, and also adjustment of the concentration of the fuel solution by adjustable fuel dosing, it is possible to adjust the concentration of the fuel vapour and the water vapour independently of one another. Moreover, the filling quantity in the humidification unit can have a further influence on the concentration of the vapours. By varying the concentration and the temperature of the fuel solution, the vapour pressure of the individual constituents of the fuel solution is adjusted. By this means, the composition of the carrier gas, i.e. the gaseous fluid, is set. The vapour pressure curves depending on temperature and molar composition can therefore be used as the basis for controlling the fuel cell unit in the system controller.

For precise control of the vapour pressures it is advantageous to measure the concentration and/or the filling quantity of the fuel solution and/or the anode volume flow. The concentration of the fuel vapour in the anode fluid is normally adjusted according to the conversion of fuel, i.e. proportional to current intensity. The concentration of the water vapour in the anode fluid is for instance adjusted according to the humidification requirement of the electrolyte and the need for water recovery.

If for instance the fill level of the humidification unit should be increased by greater water recovery, it may be advantageous to evaporate more fuel and to produce more water at the cathode by increasing current intensity and/or through an increased fuel crossover. This will lead with appropriate membrane-electrode combinations to an increasing back-diffusion of water to the anode chamber of the fuel cell. This additional water is fed via the carrier gas to the humidification unit and can be precipitated as condensate. Or with a lower water vapour partial pressure it can be ensured that less water diffuses from the anode through the electrolyte to the cathode and is discharged with the cathode exhaust gas.

At the same time, an operating state of the humidification unit is wanted in which the water concentration of the outflowing gaseous fluid should be less than before and the methanol concentration should remain constant. To achieve this, the temperature in the operating chamber is lowered, with a simultaneous increase in the methanol concentration, until the water vapour pressure of the new solution has fallen to a suitable value.

At a higher load, the volume flow of the supplied carrier gas can be increased to enrich more carrier gas with fuel, and in this way to supply the fuel cell with more fuel. For reliable regulation of the fuel amount via the volume flow control, the humidification unit is so designed that even at maximum flow of the carrier gas, both the fuel and water content of the carrier gas are saturated.

If a fuel cell is used with an electrolyte or an electrolyte system which is damaged by water, then excessively high humidification of the carrier gas with water vapour should be avoided. This in turn can be done with a control system and temperature measurement of the fuel solution and the fuel cell.

Self regulation of the fill level or filling quantity of the operating reservoir for systems in which the anode fluid unit requires extra heating may be achieved using a special layout of thermal bridges. Here, use is made of the effect of a degree of water feed and discharge to or from the anode fluid which is dependent on the water content of the anode fluid. As described, the water release from the anode chamber into the cathode fluid is greater, the higher the water partial pressure in the anode fluid. A rise in water partial pressure takes place if the temperature in the operating reservoir or the humidification area is increased. A self regulating temperature increase may be effected via the fill level of the fuel solution with a simultaneous matching layout of the thermal bridges in the operating reservoir. It is possible to design the layout for a greater temperature input at higher fill level. This is based on the effect of a higher heat emission at the liquid phase contact of the thermal bridges than at the gaseous phase contact. The thermal bridges may be designed to reinforce the effect of emitting considerably more heat when they are covered with liquid rather than being in the gaseous phase. Therefore the temperature of the fuel solution rises at an increasing rate at the heat exchanger surfaces of the thermal bridges which are covered with liquid.

A higher water partial pressure in the anode fluid causes a larger water loss by diffusion through the electrolyte. A higher fuel vapour pressure moreover causes a higher supply lambda of the anode, which leads to an increased so-called "fuel crossover" or to increased water production at the cathode. These effects in turn result in a reduction of the fuel solution volume which therefore leads to a lowering of the fill level and thus to a drop in temperature. On the other hand, with a low fill level the solution cools down and, due to lower water vapour production, the water concentration in the anode chamber decreases which minimizes the water loss. This compensating process stabilizes the volume in the humidification unit.

A simpler embodiment of the fuel cell unit is possible especially when used in a fuel cell system with the following characteristics: a) the water loss in the operating reservoir is low because of water diffusion through the electrolyte, and b) the power of the fuel cell is dependent on the methanol concentration of the anode fluid only to a limited extent. In this case it can be operated without a more costly control of methanol concentration and fill level. With such a humidification unit the fill level control is easily achieved by the dosing of fuel or fuel solution until the wanted fill level is reached. In this design, the fill level is measured by a fill level measurement in the operating reservoir. The temperature of the fuel solution can be adjusted according to the actual methanol demand.

The operating reservoir and the humidification chamber can be segmented into areas in which the fuel solution has different temperatures. The separated areas are to a certain degree thermally insulated from one another. This segmentation may for example be effected by means of partitions with openings which are dimensioned according to the wanted fluid flow from one part of the operating reservoir to the other. The different chambers may have their own inlets and outlets. In this way the anode may be supplied by branch flows from chambers at different temperatures. Control of the anode supply may be effected by regulating the values or the relationships of the separate branch flows.

A segmentation of the chambers is also advantageous when the boiling point of the fuel is lower than the operating temperature of the fuel solution in the operating reservoir and for this reason a dilution of the fuel solution must first take place.

Segmentation of the operating reservoir and/or the humidification unit is also useful for embodiments in which the condensate of the excess anode fluid is collected, especially in the case of an open and unpressurised feed of the anode fluid without pumps.

A segmentation of the operating reservoir or the humidification unit is also useful in the case of embodiments in which, especially after start-up, an anode fluid with high vapour concentrations should be provided for the fuel cell. In this case it is possible to electrically preheat only the segment which contains the humidification unit or a part of it.

Besides condensate, however, other liquids may also be fed through the opening of the humidification unit. Feeding takes place using a pump or a liquid column which is connected to the fuel solution and pushes the liquid into the operating liquid by gravitation.

For feeding the liquid into the humidification unit by a liquid column the inlet can be designed in a way that vapour cannot escape from the fuel solution. This can be achieved with a stationary water column between the condensate feed or water reservoir and the inside of the humidification unit. This can for instance be achieved by a siphon which is filled with the inflowing water or a suitably designed tube, for example with a small diameter.

The intake of condensate can be designed for an automatic setting of the intended fill level of the humidification chamber by means of a special shape of the receiving chamber and its connection with the humidification chamber, together with a special layout of the outlet device. This is based on the one hand on the principle of communicating pipes between the humidification chamber and the condensate chamber connected to it, and on the other hand to the fact that the pressure differences in the gas phase of the two chambers are relatively constant and in most versions are only a few millibars. Even with this special design of the humidification chamber with a condensate collection chamber, no reflux of fuel solution into the condensate collection chamber should occur. This is achieved by a connection of the condensate collection chamber with the humidification chamber through an opening with a small diameter (for example 0.2 to 4 mm) or through another hydraulic resistance, resulting in a directed flow from the condensate chamber to the humidification chamber. Because of the hydraulic connection of the condensate collection chamber and the humidification unit through an opening, the fill level of the fuel solution in the humidification chamber can be adjusted by control of the fill level in the condensate chamber. The fill level in the condensate chamber is adjusted or limited via the height of the fluid outlet. Therefore the condensate chamber can take the liquid condensate from the two phase fluid until the level of the liquid has reached the fluid outlet of the condensate chamber. Additional condensate is then emitted with the gas phase through the fluid outlet. The fill level in the humidification chamber is constant as long as the amount of incoming condensate is greater than the amount of water or fuel leaving the system. The excess condensate may in turn be led back to the cathode exhaust flow, while liquid condensate not accepted from the condensate chamber can be fed to the cathode exhaust flow in such a way that, e.g. by means of special evaporation bodies, it can be evaporated in the cathode exhaust gas before the latter leaves the system.

For appropriate control of the fuel cell system, a sensor may be installed in the condensate chamber to generate a changed measuring signal if one or more defined fill levels are not reached. This control affects especially the setting of the level of the amount of cathode exhaust gas that should be cooled via a heat exchanger.

Fed condensate or other liquid such as separately fed water may be used, before reaching the fuel solution, to absorb carrier gas emitted from the circuit by fuels These may be most suitably transferred in the liquid phase, when the liquid is as cool as possible and the contact time of the two fluids is as long as possible, for example through the use of large surfaces.

The humidification chamber can include an overflow which discharges the surplus fuel solution in the case of overfilling. The discharged fuel solution is collected separately, evaporated or fed into the anode or cathode compartment of the stack.

An outlet opening may also be provided close to the bottom of the liquid compartment for changing the content or removing deposited impurities.

Depending on pollution or contamination of the fuel, devices for purification or treatment may be provided. Means such as ion exchangers or filters can be used to remove any impurities which are present. These means may either be integrated in the humidification unit or installed outside the humidification unit. In this case the humidification unit is provided with one or more openings through which the fuel solution can be removed and then returned partially or entirely after purification or treatment.

Since with this system principle the gaseous anode fluid flow from or out of the fuel cell stack is moved normally with a conveyor, this conveyor can be coupled with the cathode volume flow conveyor (air). This can be done for example with a so-called double-headed pump that uses one drive unit for two conveyors. Depending on the level of the two volume flows, the pump heads may have differing dimensions. The use of such a conveyor compensates for the disadvantage of the gaseous supply revealed here as compared to the anode supply of DMFCs with liquid fuel. This disadvantage lies in particular in the fact that, as a rule, the delivery of a gaseous fluid with evaporated methanol requires more energy than the delivery of a liquid methanol solution, due to the higher volume flows.

Fuel cells with low output power e.g. 0.01-30 watts can be supplied using a special design of the humidification unit. For such an embodiment, quite small gas pumps or blade wheels can be used to maintain the anode fluid circulation. The circulation can also be maintained without mechanical moving conveying equipment, by using physical effects. Here, anode fluid is transported to or from the humidification unit for instance on the basis of gas expanding due to a temperature increase and contracting through temperature decrease. With this invention the anode fluid can be circulated without the electrical energy required for a conveyor. In principle the necessary heat exchangers could also be cooled by air without mechanically moved conveyors.

According to one embodiment, the humidification unit can include an inspection window which gives a view into the humidification unit. This can be used for example for checking the filling level. Depending on the design, the inspection window may be of any desired size, so as to make visible the details of interest to the user.

For the purpose of providing an appropriate supply of anode fluid to the anode at the correct concentrations of the reactands water and methanol, and to maintain a certain filling level plus adequate humidification of the electrolytes, the following values or parameters can be measured and evaluated: temperature of the fuel solution, temperature of the fuel cell, filling level of the fuel solution or at least a signal for the minimum filling level, and in addition any single cell voltages, volume flows of the anode and cathode fluids, proton conductivity of the electrolytes and fuel concentration in the fuel solution. For an appropriate supply, with the aid of these measured values, the following parameters in the humidification unit may be adjusted: the fuel concentration in the fuel solution via the dosing rate and the fuel solution temperature.

Compensation for the water loss which occurs due to diffusion of water from anode to cathode of the fuel cell and to discharge through the cathode can be made by condensing the water vapour of the cathode exhaust gas from the fuel cell reaction. Since however, because of the need for a large heat exchanger it is disadvantageous to condense the whole cathode exhaust flow, only a part of the cathode exhaust flow is cooled by a heat exchanger and cooling devices to recover water through condensation. Here, the amount of recovered water depends on the water loss in fuel cell operation. This in turn is expressed in the filling level of the fuel solution in the humidification chamber. The filling level in the humidification chamber can be determined by measurement and with this value the partial flow of the condensing cathode exhaust gas is adjusted to a condensate production which is high enough for the required fill level.

The humidification unit is suited for the use in a fuel cell system according to a second embodiment. This includes a so-called reformer or rather a device for the conversion of fuel vapour to a hydrogen-rich gas. Here the humidification unit serves to supply the reformer with a fuel-enriched carrier gas. A so-called burner which oxidises fuel by catalytic means or by flame may be used to generate the necessary temperatures for the reaction of the reformer or to avoid a cooling of the reformer due to the endothermic reformer reaction in the case of a steam reformer. This burner can be fed with a branch flow of the enriched anode fluid from the humidification unit with additional atmospheric oxygen. The burner may however also, as shown in the prior art, be fed with anode exhaust gas. The necessary heat transfer is made possible by thermal coupling of the burner with the reaction chamber of the reformer unit. In particular at start-up, when no anode exhaust gas is yet available, it is practical to use fuel vapour from the humidification unit. In this case the humidification unit has another outlet opening, by which its fuel vapour is removed for a heating device. Cathode exhaust gas or fresh air is used for the oxygen supply of the fuel-enriched gas. With this invention a use of anode exhaust gas is possible which uses only the part of the exhaust gas which is generated from additional carbon dioxide production. The resultant scope for setting the feed flow for the exhaust gas burner at the lowest possible level facilitates optimal use of fuel.

Since, in this circulation mode, the hydrogen concentration in the gas chamber of the humidification unit does not decrease after shutdown of the system, the fuel cell may be started with this reformate even though the reformer is not yet producing enough hydrogen. For this purpose the humidification unit can be designed with a gas chamber which contains enough hydrogen-rich gas for a cold start. A connection may also be provided in which hydrogen-rich gas can be branched off. From this connection reformate gas can be pumped into a pressure tank or collected in a metal hydride storage unit.

For fuel cell systems with a reformer, the waste heat of the device (normally a catalytic burner) required to heat the reformer can be used also for the humidification unit. This burner unit is more advantageous as heat source at the start up than the fuel cell stack because it reaches higher temperatures more quickly. But during operation a heat transfer from the catalytic burner to the humidification unit can reduce the efficiency of the system. Therefore the heat flow from the burner to the humidification unit can be designed to be variable (for example using a fan or a moveable device).

For applications involving pre-reforming, anode fluids are used with a steam to carbon ratio - the proportion of water vapour to carbon which is contained in the fuel (S/C)- of 1:2 to 1:7, in particular between 1:2.5 and 1:4. A highly overstoichiometric S/C is advantageous when operating without a second catalytic stage for carbon monoxide purification. Since in the case of these fuel cells a strong dilution of the anode fluid with carbon dioxide can be disadvantageous because the hydrogen concentration in the anode chamber decreases due to carbon dioxide, vapour mixtures with a low carbon dioxide concentration are used. This requires for example in the anode fluid unit, with a 3 molar methanol solution, temperatures of around 80° C. to obtain a vapour mixture with less than 50% carbon dioxide concentration and approximately 17% methanol vapour and 38% water vapour.

Various fuel cells, especially the SOFC and the molten carbonate fuel cell (MCFC), have a steam reforming phase which precedes the anode reaction. This steam reforming supplies the anode with a fuel gas with varying hydrogen content depending on the operating parameters and the degree of conversion. For this purpose catalysts such as nickel alloys or nickel cermet or ruthenium, iron or cobalt are used in the anodes of the high-temperature fuel cells and are able to catalyse the steam reforming and also the anode reaction. For use without a reformer, anode fluids with less water vapour content are used, since use can be made of the product water generated.

It is also possible in steam reforming for suitable catalysts—as described for a DMFC with internal reforming in DE 19 945 667—to be placed upstream of the anode catalyst. For example Cu-Mn-O or Cu/Zn/$Al_2O_3$ are suitable as catalysts for this purpose and achieve relatively high conversion rates at temperatures of 260° C. At a temperature of 200° C. the conversion rates are still relatively low. For example phosphoric acid fuel cells can be operated with methanol at this temperature. For reforming at low temperatures, the anode is therefore supplied with a fluid which also contains, besides hydrogen, high proportions of methanol and carbon monoxide. To ensure an appropriate and continuous supply at varying operating temperatures a gaseous feeding with the aid of the humidification unit is advantageous. In particular, depending on the operating temperature and the resultant conversion rates the composition, especially the fuel concentration, of the feed mixture of fuel and water vapour can be adjusted appropriately by varying the temperature and concentration of the fuel solution.

The humidification unit is preferably insulated in a suitable manner from other system components such as the stack or reformer and the external environment. The insulation can be made of multiple layers and can have openings for tubes and cables.

The construction of the humidification unit can be flexible and modular. The connections can be made detachable to enable the replacement of components such as for example the fuel cell stack or the device for treatment of the fuel solution.

Since the humidification unit is a central element and can be produced favourably for example from plastic, it may also be extended as a supporting device for other system components or assemblies which can be fixed firmly or releasably in this extension.

The humidification unit can be used for different types of PEMFC. The electrolyte can be adapted depending on the fuel cell type or the fuel type and operating temperature. Suitable for low and medium temperature PEMFCs (40-130° C. operating temperature) are for example flourinated polymers with sulphonic acid groups, sulphonated polycarbonate/hydrocarbon systems and polyetheretherketone (PEEK) with sulphonic acid groups. These electrolyte membrane systems may be reinforced with fabric. To operate fuel cells with gaseous fuels at temperatures about 80° C. it is necessary to keep the water retention in the electrolyte at a high level, in order to maintain high ionic conductivity even with low humidification by the anode and/or cathode fluid . For this purpose a high ion exchange capacity of the electrolyte is advantageous. In addition, silicates, silicon zirconium or titanium oxide, zirconium phosphate, heteropolyacids such as for example phosphotungstic acid, flourinated polymers or other additives may also be used in the electrolyte system. The use of a diffusion barrier layer in the membrane or in an electrode also makes possible an increase in humidity in the electrolyte membrane and therefore qualifies it for operation with the humidification unit. To supply such electrolytes with enough humidity, these fuel cells need a high water vapour content. For example a good supply of water vapour may be obtained with a 2.3 molar methanol solution in the humidification unit at a humidifying temperature of 72° C. This results in a methanol vapour concentration of around 10 percent by volume and a water vapour concentration of 28 percent by volume in the carbon dioxide carrier gas flow. If the temperature of the liquid is changed e.g. to 67° C. the methanol vapour concentration at saturation point is 8 percent by volume and the water vapour concentration is 23 percent by volume with a 2.3 molar methanol solution. Increasing the temperature to 77° C. leads to a methanol vapour concentration of 12 percent by volume and a water vapour concentration of 35 percent by volume. This shows that the concentrations of the individual constituents do not always change in a linear relationship with temperature, and a change in temperature can alter the ratio of methanol vapour to water vapour in the carrier gas. In connection with a temperature rise, in particular the water vapour content increases more strongly than the methanol vapour content. Of course the ratio of methanol vapour to water vapour can be altered by adjusting the methanol concentration in the aqueous solution, in which case an increase of methanol in the aqueous solution leads to an increase of the methanol in the carrier gas. The same applies for other fuels but the effect of the temperature on the concentration in the carrier gas may vary depending on the different boiling points.

In the case of high-temperature PEMFCs (130-250° C. operating temperature), the electrolytes for PEMFC are a matrix such as polybenzimidazole (PBI) or polyoxadiazole in which an acid is bound. Normally the acid is a "phosphoric acid", which means in this context also polyphosphoric acids and compounds which contains phosphoric acid groups. These membranes normally do not need humidification for good proton conductivity. Polysulphonic acids, acid-base combinations e.g. polyvinylphosphonic acid or sulphonic acid with SPEEK-PBI, organic membranes with inorganic components such as PEEK or flourinated polymers with zirconium phosphate can also be used for such medium- and high-temperature PEMFC electrolytes. Suitable high-temperature systems with bound acid on a silicate base, or inorganic matrixes with embedded acids, or hybrid proton conductors, are also being developed.

In high-temperature electrolyte systems, ionic conductivity has no or only a low dependence on the availability of water. Fuel cells with such an electrolyte system may therefore be supplied with an anode fluid containing less water and more fuel. To avoid electrolyte damage from liquid water, the humidification temperature in the humidification unit during start-up must be low enough to prevent water from condensing in the fuel cell stack. During operation, there will be no liquid water in the stack because of the high temperature. A good supply of a DMFC with such electrolytes with a 4 to 7.5 molar methanol solution would be achieved at a temperature of 62-74° C. in the humidification unit.

Besides PEM fuel cells, MCFCs or SOFCs may also be supplied by the anode fluid unit. Especially suitable is an anode fluid unit with water vapour feeding in addition to the fuel feed. On account of internal steam reforming which takes place at the anode catalyst such as for example nickel and at an operating temperature in excess of 600° C., the water vapour requirement is supplied from the humidification unit. In this case fuel cell temperatures up to 1100° C. can be reached and it is important to include a heat exchanger which cools the anode fluid which flows from the fuel cell into the humidification unit. For the preheating of the anode fluid from the humidification unit, a heat exchanger unit may also be used. Such systems may also be combined with a reformer.

Figure 2:
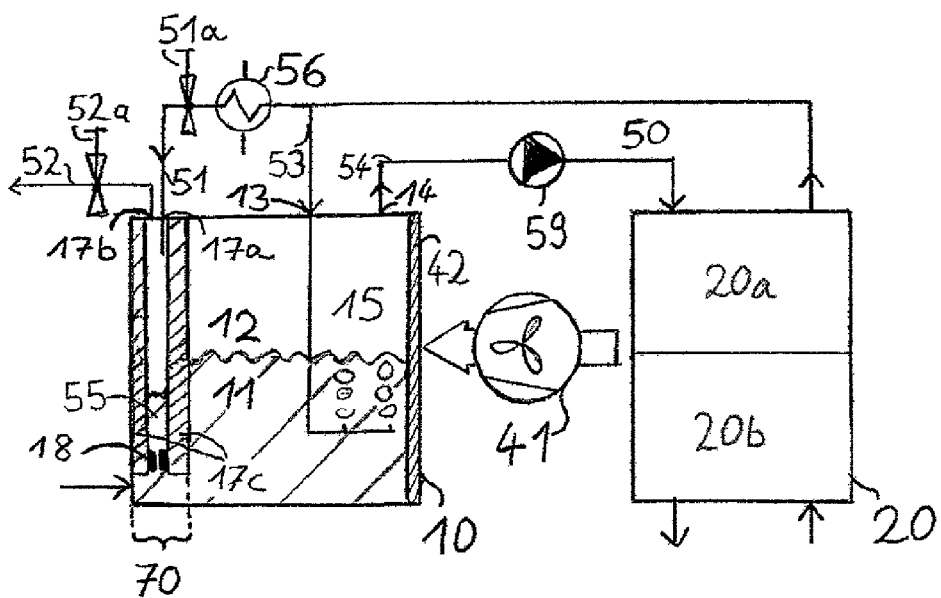
Figure 3A:
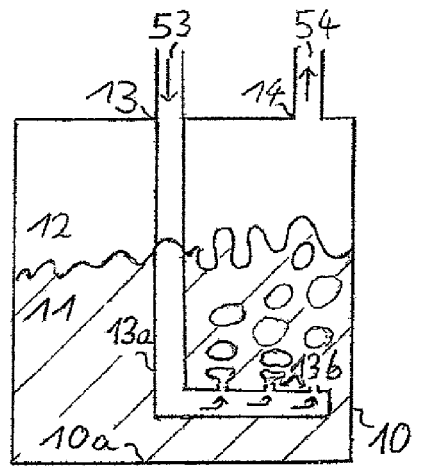
Figure 3B:
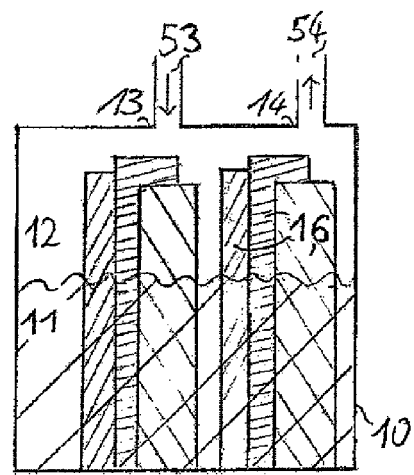
Figure 3C:
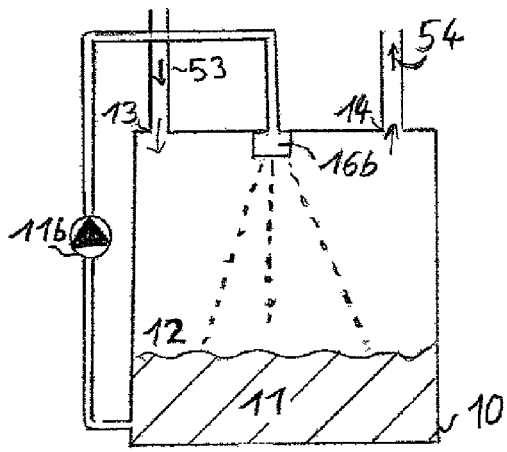
Figure 3D:
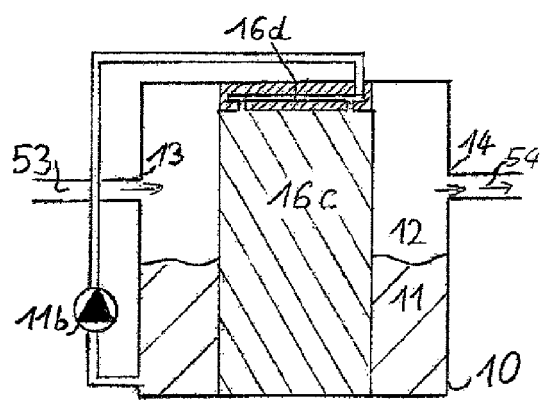
Figure 4A:
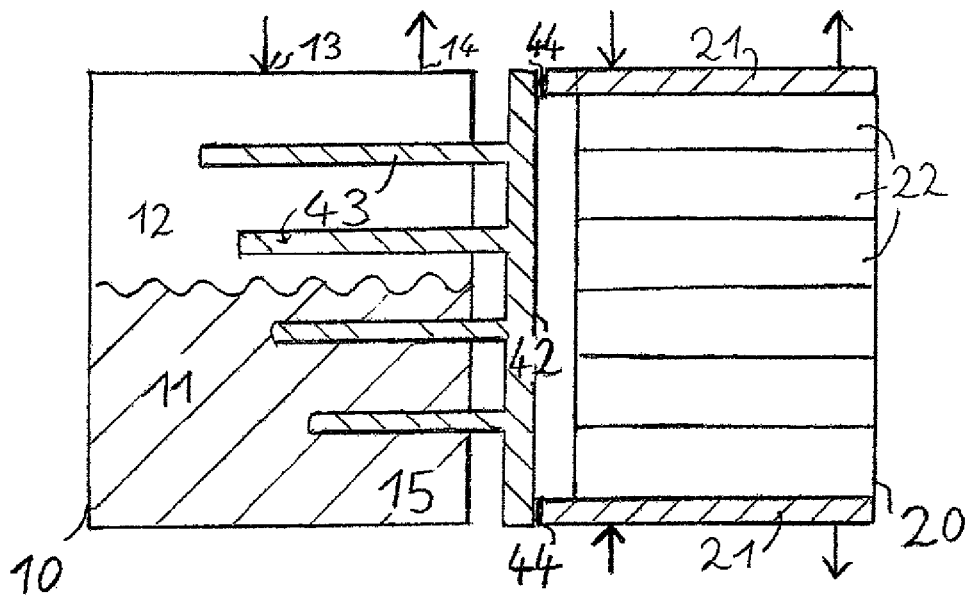
Figure 4B:
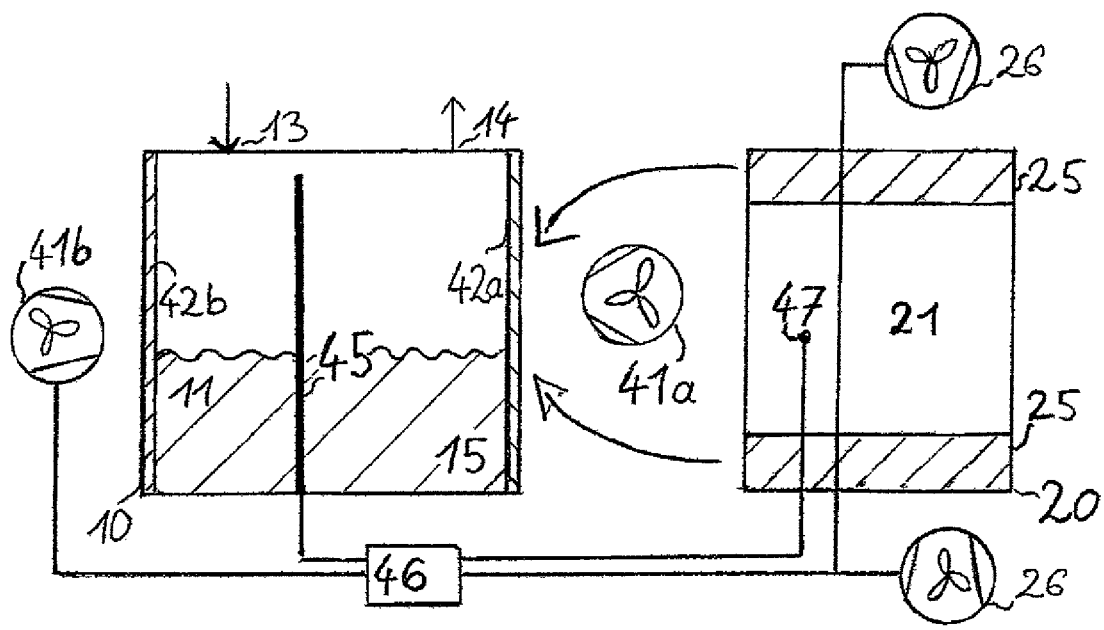
Figure 5:
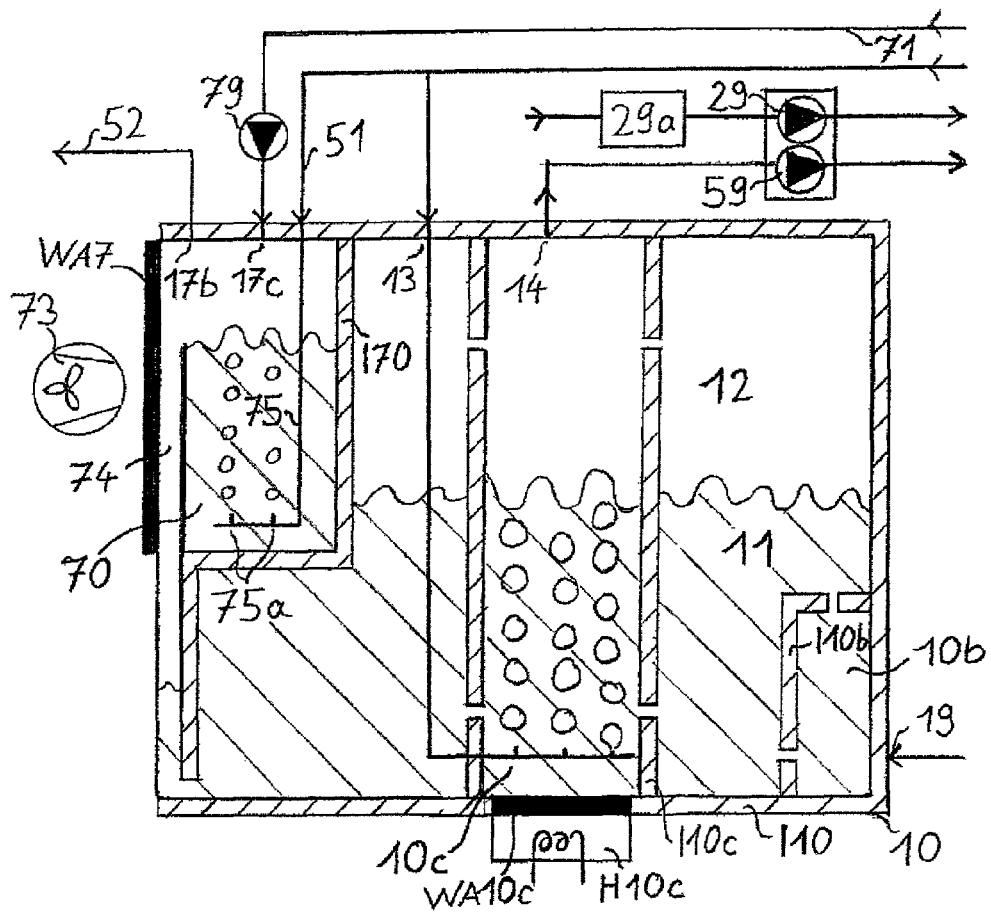
Figure 6:
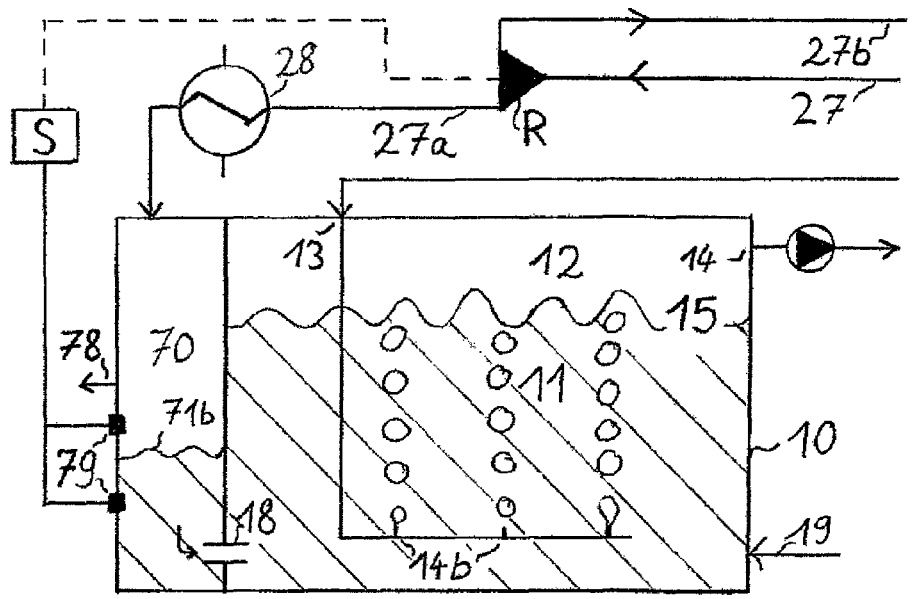
Figure 7:
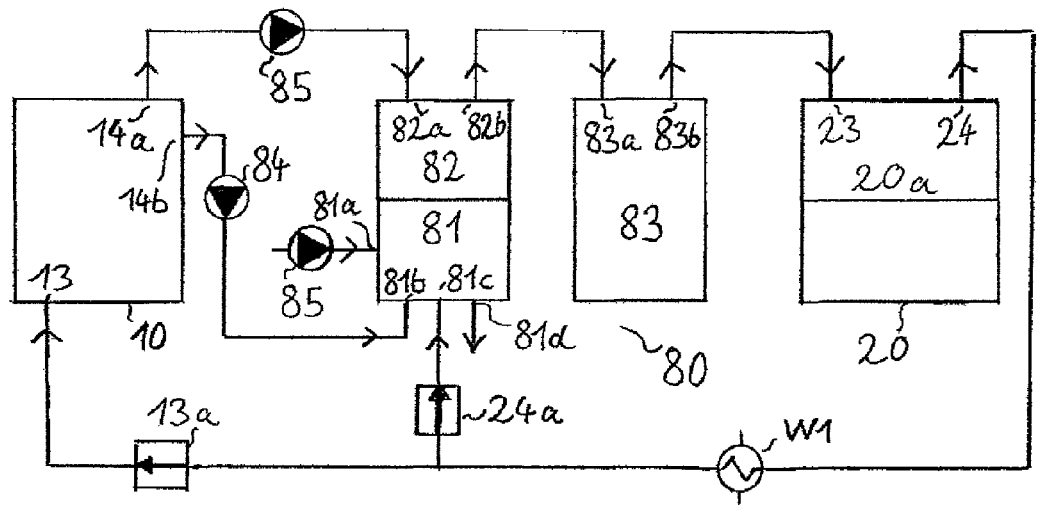
Figure 8:
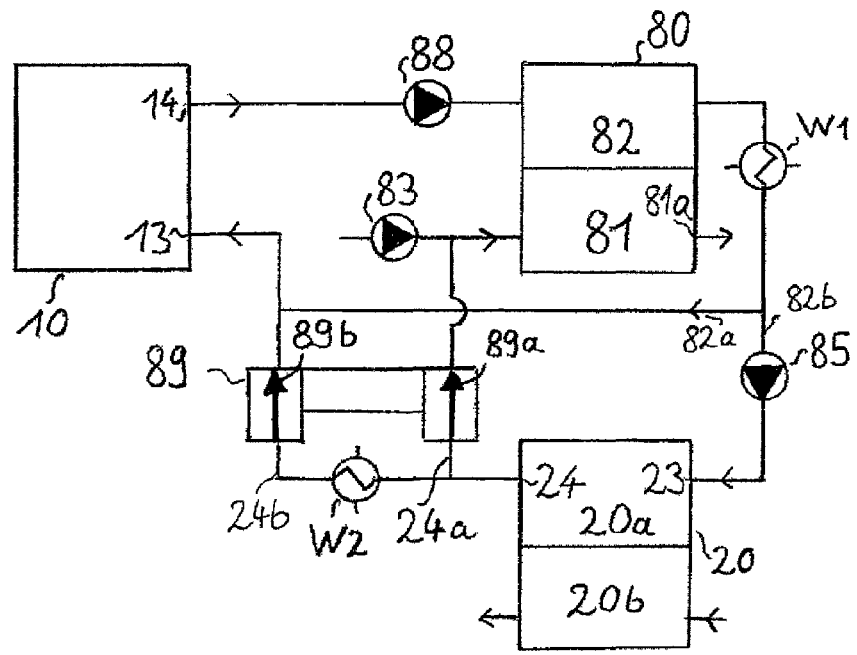
Figure 9:
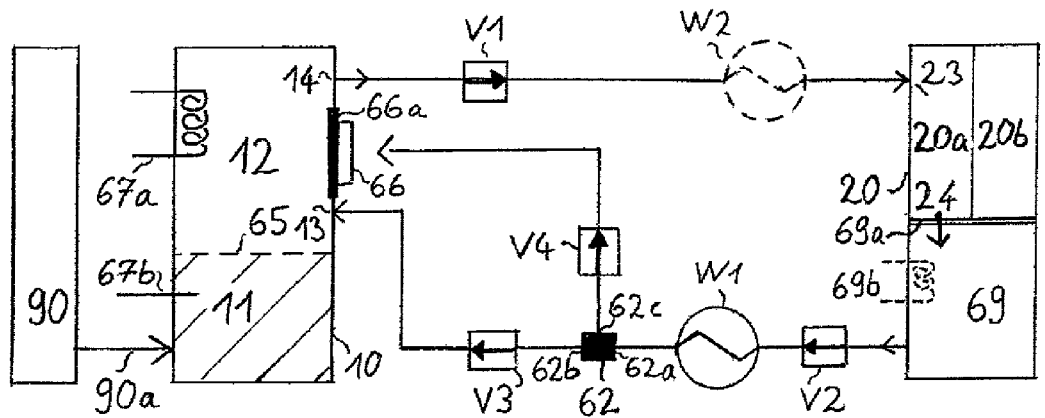
Figure 10:
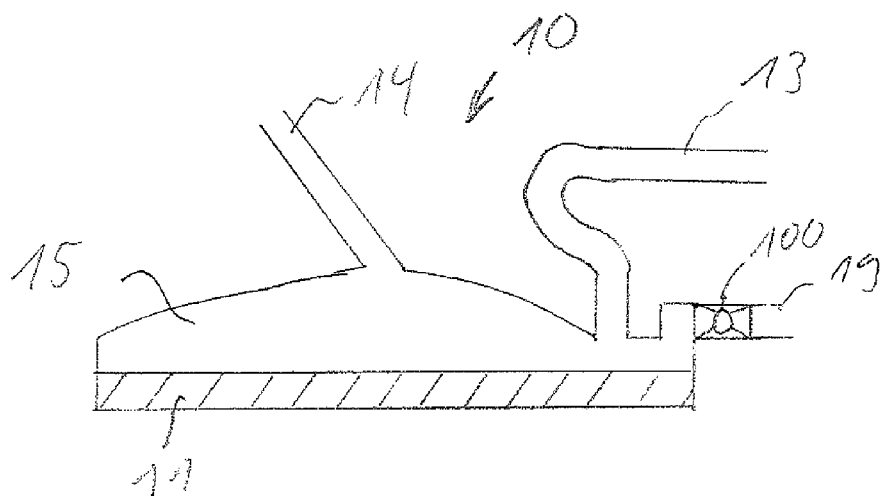

The invention is explained in detail below with the aid of embodiments and with reference to the drawings. The drawings show in:

FIG. 1 a schematic view of a fuel cell system according to the invention with a humidification unit;

FIG. 2 a view of the humidification unit together with an anode circulation containing this humidification unit;

FIGS. 3a, 3b and 3d possible means of the enriching the carrier gas with vapours of the fuel solution;

FIGS. 4a and 4b views of the heat transfer from the fuel cell to the humidification unit;

FIGS. 5 and 6 more detailed views of two embodiments of the humidification unit with anode exhaust gas purification;

FIGS. 7 and 8 a schematic view of the fuel cell system with humidification unit and a reformer;

FIG. 9 view of a fuel cell system with humidification unit in which the circulation of the carrier gas is sustained without mechanical parts;

FIG. 10 view of a simply designed humidification unit.

FIG. 1 shows a fuel cell unit according to the invention. This has inter alia a fuel tank 90, a humidification unit 10 and a fuel cell 20. Gaseous fluid, also called anode fluid, is circulated by a pump 59. This circulation is called the anode circulation 50. According to the anode circulation 50, the anode fluid depleted in the anode flows from the outlet 24 of an anode side 20a of the fuel cell 20 to the inlet 13 into the humidification unit 10. In the humidification unit 10, consumed fuel vapour in the anode fluid is replaced (and in some fuel cell types, depleted water vapour too). The anode fluid, thus enriched, flows via an outlet 14 of the humidification unit 10 and an inlet 23 into the anode side 20a of the fuel cell 20, where it is once more depleted by the fuel cell reaction.

I.e. the anode fluid that is not ejected after passing the anode side 20a of the fuel cell 20, but remains in the anode circulation 50, flows into the inlet 13 of the humidification unit 10. On the other hand, anode fluid which has become surplus due to newly produced carbon dioxide leaves the circulation via an outlet 51.

Between the humidification unit 10 and the fuel cell 20 is a device 40 for the conducting of waste heat from the fuel cell 20 to the humidification unit 10. The transfer is effected via an air flow or a thermal coupling. There is also a pump 29 which supplies a cathode side 20b of the fuel cell 20 with air and the already mentioned fuel tank 90, from which the fuel solution is fed into the humidification unit 10 via a conveyor 99 and an inlet 19.

FIG. 2 is a schematic view of a possible embodiment of the humidification unit 10 and the anode circulation 50. In this embodiment, depleted anode fluid 53 flows from the anode side 20a of the fuel cell 20 into a humidification chamber 15 of the humidification unit 10. There it is enriched with vapours from the fuel solution 11 by bubbling through the fuel solution 11. After passing through an upper part 12 of the humidification chamber 15 filled with gaseous anode fluid, enriched anode fluid 54 is fed back to the fuel cell 20 through the outlet 14 by the pump 59. The excess anode fluid 51 is cooled here by means of a heat exchanger 56, with fuel solution 55 condensing out before it is separated by gravitation via an inlet 17a into a condensate collection chamber 70.

Gaseous anode fluid 52 leaves the condensate collection chamber 70 through another opening 17b. Installed in front of the inlet 17a and the outlet 17b are throttles or other hydraulic resistances 51a and 51b which control the pressure of the anode circulation. To prevent a flow of fuel solution 11 into the condensate collection chamber condensate collection chamber, thereby heating the latter or enriching it with fuel, a constriction or a duct 18 is provided between the condensate collection chamber 70 and the humidification chamber 10. The duct 18 can have a diameter for example between 0.1 and 4 mm. Instead of a duct, however, a valve or a flow resistance may also be provided. The condensate collection chamber 70 is thermally insulated by suitable partitions 17c to minimize a heating of the condensate and any resulting evaporation of fuel solution. From the fuel cell 20 heated air is directed on to a heat exchanger surface 42 of the humidification unit by means of a fan 41.

FIG. 3a shows a variation of the enrichment of the carrier gas with vapours from the fuel solution 11. The depleted anode fluid 53 flowing in through the inlet 13 of the humidification unit is directed by means of a small tube or pipe 13a near to a base 10a of the humidification chamber below the fill level of the fuel solution 11, and there is bubbled into the fuel solution 11 through suitable outflow holes 13b. At the same time fuel vapour and water vapour may be transferred into the part 12 of the humidification chamber filled with gaseous anode fluid to compensate for fuel loss caused by the anode reaction. The enriched anode fluid 54 leaves the humidification unit 10 in the direction of the anode chamber of the fuel cell via the outlet 14.

FIG. 3b shows another variation of the fuel enrichment of the carrier gas. According to this embodiment, the carrier gas 53 flows over the surfaces of humidification bodies 16 wetted with fuel solution 11 and is thereby enriched with fuel. The continuous wetting of the surfaces of the humidification bodies 16 is caused by a partial immersion of the hydrophilic and/or porous humidification objects 16 in the fuel solution 11, so that the capillary effect transfers fuel from the fuel solution store 11 on to that part of the surfaces of the humidification objects 16 which lies above the liquid level and is therefore in that part 12 of the humidification unit 10 filled with gaseous anode fluid. In this case too, the fuel-enriched anode fluid 54 leaves the humidification unit by the outlet 14.

In the alternative embodiment of the humidification unit 10 shown in FIG. 3c, a pump 11b feeds the fuel solution 11 from the lower part of the humidification unit 10 to a nozzle 16b which is in the part 12 of the humidification chamber 15 filled with gaseous anode fluid. This nozzle 16b, which can be replaced by a sprinkler system, produces fuel solution 11 droplets which are distributed in part 12 filled with gaseous anode fluid. Through the contact with the droplets with the depleted anode fluid 53 flowing into the humidification chamber 15 via the inlet 15, the anode fluid is once more enriched with fuel vapours and if applicable with water vapour.

FIG. 3d shows a variation of the fuel enrichment of the anode fluid 53, according to which a pump 11b feeds fuel solution 11 from the lower part of the humidification chamber to a feeder 16d. This feeder wets a porous object 16c with fuel solution 11. The upper part of the porous object 16c is located in the area of the part 12 of the humidification unit 10 filled with gaseous anode fluid. Through the contact of the gaseous anode fluid 53 with the wetted porous object 16c, the anode fluid is enriched with fuel vapours and if applicable with water vapour.

In FIG. 4a again an alternative humidification chamber 15 of the humidification unit 10 is pictured. In this embodiment the fuel solution 11 is also present in the lower part of the humidification chamber 15, which is adjoined by the overlying part 12 of the humidification chamber 15 filled with gaseous anode fluid. In the figure the fuel cell 20 is shown schematically on the left side with endplates 21 and the bipolar plates 22. Placed between the humidification unit 10 and its humidification chamber 15, and the fuel cell 20, is a heat conducting connection 44. This makes possible a heat flow from the fuel cell 20 to the humidification chamber 15, and the introduction into this chamber of the energy needed for partial evaporation of the liquid fuel solution 11. In other words. the endplates 21 of the fuel cell 20 are used as heat source in this embodiment.

The energy transfer is optimized by the use of heat-conducting materials. Metal materials are for example highly suitable for this purpose. Short-circuits may be prevented through electrical isolation of the heat-conducting connection 44. In this embodiment the heat energy is directed on a collector surface 42. From there it is transferred for heat input on to bodies 43 which protrude into the humidification unit 10. The bodies 43 for heat input are so designed in respect of dimensions, surface and position in the humidification chamber 15 that they provide a higher energy input at high fill levels and a lower energy input at low fill levels. With the aid of the previously described effect of different heat absorption from liquid and gaseous phases, this design is able to humidify the carrier gas with self-regulation.

FIG. 4b shows another alternative embodiment of the fuel solution 11 containing humidification unit 10 and the fuel cell 20 wherein here one end plate 21 of the fuel cell 20 is shown in a top view. At both sides of the fuel cell 20 are cooling fins 25 which heat the air flowing past. The cooling air of the fuel cell 20 is fed to a first heat exchanger surface 42a of the humidification unit 10 with the aid of a fan or a blower 41a. The level of the heat transfer from the fuel cell 20 to the humidification unit 10 is regulated by the blower 41a, which is controlled by the control unit 46 through the measured value of a temperature sensor and/or level sensor 45. In this variant a second blower 41b is provided, which blows cooling air on to a second heat exchanger surface 42b of the humidification unit 10, to facilitate rapid cooling of the humidification unit. This blower 41b is also regulated by a sensor and a control unit. Also shown are a further two blowers 26, which allow temperature control of the fuel cell 20 by means of a temperature sensor 47 and control unit 46 without affecting the temperature control of the humidification unit 10. This design may also be used for fuel cell systems which will exceed the critical anode exhaust gas temperature, i.e. the temperature difference between humidification unit and anode chamber is too high, and a changeover from heating to cooling of the anode fluid unit should be made.

FIG. 5 shows an embodiment of the anode fluid unit 10 with an integral chamber 70 for the anode exhaust gas wash. To make the anode fluid unit 10 more independent of ambient temperature fluctuations, insulation 110 is provided. In this embodiment input water, in this case cathode condensate 71, is used to wash out fuel vapour from the excess anode fluid 51. Described as excess anode fluid is that portion of the fluid which flows out of the anode and, because of the additional carrier gas formed by the anode reaction, must be expelled from the circulation. The water used for washing out is described below as washing water. For the washing out process, the washing water is fed into the chamber 70 via an inlet 17c, in this case by a pump 79. In a similar manner to the vapour enrichment process, the excess anode fluid 51 is bubbled into the washing water through a pipe 75 provided with small openings. Since the washing water has only a low fuel concentration, most of the gaseous fuel passes into the liquid phase through contact with the washing water. The purified excess anode fluid 52 leaves the chamber 70a by an outlet opening 17b.

This design is used for instance for a fuel cell stack with a phosphoric acid electrolyte system and an average output of 1000 watts with a single cell voltage of 0.52 volts. The anode is supplied with a fluid from the humidification unit 10 with the following molar composition: methanol vapour 16%, water vapour 28%, carbon dioxide 56%, others 1%. With a diffusion of methanol to the cathode of 3% and 70° C., the volume flow of 1.5 l/s correlates to a supply lambda of 2.5 for the anode reaction. The cathode volume flow is roughly 1.7 l/s at a supply lambda of 2.2 and a temperature of 20° C. Due to the similar volume flows a double headed pump 29, 59 is provided, with pump heads adapted to the different volume flows.

To enhance the purification effect, or to minimize the fuel content in the emitted anode fluid 52, the chamber 70a for the anode exhaust gas washing is cooled by a heat exchanger or a heat exchanger surface WA7 and a cooling airflow which is here moved by a fan 73. For this reason the sides 17 from the anode exhaust gas washing to the humidification chamber 10 are designed to provide thermal insulation from the area of the humidification unit 10 containing the fuel solution 11. So that the fill level of the washing water is unaffected by the fill level of the fuel solution 11, an overflow pipe 74 is provided. The washing water passes into the fuel solution 11 via this overflow pipe 74. Fuel solution is fed to a separate segment 10b of the humidification unit 10 through the inlet 19. The fuel solution 11 in this segment 10b is cooler then the fuel solution in the rest of the humidification unit 10, because segment 10b has no external heat input and is furthermore thermally insulated on the inside by a thermally insulating partition 110b. If the insulation of 110b is not adequate, then this segment may be cooled similarly to chamber 70.

The segment 10c of the anode fluid unit 10 in which the anode fluid humidified is partially insulated, in respect of heat transfer and mass transfer. This segment 10c can be heated by a device with a heat exchanger surface WA10c and a heating element H10c. Heating of this segment 10c is advantageous for a fast start of the system and when a time-consuming heating of all the liquid 11 is not desired. The mass transfer and its limitation from and into the segment 10c may be optimized with closable valves, apertures, etc.

FIG. 6 shows an embodiment of the humidification unit 10 which includes, apart from the humidification chamber 15, an additional chamber 70 which can take condensate or water. This condensate chamber 70 is connected with the humidification chamber 15 by an opening or a duct 18. If condensate flows into the condensate chamber 70 in this embodiment it is led via the duct 18 into the humidification chamber 15.

The pressure loss which is caused by the flow of the anode fluid through the outlet holes 14b into the fuel solution 11 correlates to the different fill levels of condensate 71 b and the fuel solution 11. Therefore the difference of the level of the two liquids is constant under conditions of continuous operation. The fill level of the condensate in the condensate chamber 70 is limited by the position of the outlet opening 78 in the condensate chamber 70 since, in the case of a corresponding fill level, liquid condensate is discharged with the gas phase of the cathode fluid via the outlet opening 78. The fill level of the humidification chamber 15 is also limited by the constant difference in level of the two columns of liquid.

Also provided in this embodiment are sensors 79 which detect the wetting with condensate. The sensors 79 are attached to regulate the amount of condensate. With a control unit S and a controller R and the corresponding measured signal, a larger (or smaller) part of the cathode exhaust gas 27 is fed to heat exchanger 28 and therefore more (or less) condensate is recovered. The cathode exhaust gas 27 is also divided in two branch flows 27a, 27b, of which 27a flows to the heat exchanger 28, and 27b leaves the system without cooling. A drop in the fill level of condensate 71b increases the branch flow 27a which is fed to the heat exchanger 28 for cooling. In this way more water is recovered from the cathode exhaust gas 27.

FIG. 7 shows a fuel cell unit in which a reformer unit 80 for producing a hydrogen-rich gas is supplied from a humidification unit 10. Here, the humidification unit 10 is used to supply of the reformer unit 80 with fuel-enriched carrier gas. The carrier gas enriched with fuel- and water vapour passes from the outlet 14a of the humidification unit 10 into the reaction chamber 82 of the reformer 82 via an inlet 82a. To generate the necessary temperatures for the reformer reaction, a catalytic burner 81 is provided to heat the reaction chamber 82. During the system start the catalytic burner 81 is supplied with fuel vapour from the outlet 14b of the humidification unit 10 by a conveyor 84 and additionally with atmospheric oxygen by a conveyor 85. The hydrogen-rich gas is led via the reformer outlet 82b through an inlet 83a into a reformate gas post treatment stage 83. This stage serves to oxidise carbon monoxide by means of steam reformation. The reformate gas then flows via the anode inlet 23 to the anode side 20a of the fuel cell 20. Depleted anode fluid leaves the fuel cell 20 via the outlet 24 and is fed to a heat exchanger W1 for cooling. If a high-temperature fuel cell is used in this system, the temperature in the humidification unit 10 is adjusted by controlling the cooling capacity of the heat exchanger W1. After the heat exchanger the fluid is divided. One branch flow passes a control valve 13a and is fed back again to inlet 13 of the humidification unit 10. The other part of the depleted anode fluid flows through a valve 24a into the catalytic burner 81. Through regulation or control of the two valves 13a and 24a, the branch flows may be suitably dimensioned. Instead of two control valves, other valves such as non-return valves, flow resistances or pumps can also be used. With suitable pressure ratios, valve 13a or 24a may be omitted.

FIG. 8 shows a fuel cell unit in which a reformer unit 80 for producing a hydrogen-rich gas is supplied from a humidification unit 10. Here, the humidification unit 10 is used to supply the reformer unit 80 with fuel-enriched carrier gas. The carrier gas enriched with fuel vapour and water vapour is fed from the humidification unit 10 into the reaction chamber 82 of a reformer 80 by a conveyor 88. The hydrogen-enriched reformate gas is fed to a heat exchanger W1 for cooling. If supplying a high-temperature fuel cell (SOFC,MCFC), a heat exchanger W1 is not required. The cooled reformate gas is divided into two branch flows 82a and 82b. One branch flow 82b is fed to the anode inlet 23 of the fuel cell 20 via a conveyor or a valve 85. The other branch flow 82a is fed back to inlet 13 of the humidification unit 10. The branch flow 82b, after its depletion in the anode chamber 20a, leaves the fuel cell 20 via the outlet 24 and in turn divides into two branch flows 24a and 24b. The branch flow 24b passes a heat exchanger W2 and a control valve 89b and is fed back again to inlet 13 of the humidification unit 10. Since in this case the fuel cell stack is being operated at around 200° C., the heat quantity of the exhaust gas flow is higher than the enthalpy of evaporation needed for fuel enrichment. During normal operation, therefore, the temperature and consequently the humidification level in the anode fluid unit are controlled by regulating the cooling of the exhaust gas by the heat exchanger W2. To generate the necessary temperatures for the reformer reaction a burner 81, catalytic or with flame, is provided and used to heat the reaction chamber 82. The burner 81 is supplied with the other branch flow 24a of the anode exhaust gas and with air via the conveyor 83. The branch flow 24a is fed to the burner 81 via the valve 89a.

The two valves 89a and 89b are here combined to form a control unit 89. Through control of the two valves 89a and 89b the branch flows may be suitably dimensioned. Instead of two control valves, other devices such as flow resistances or pumps may also be used. Relevant control variables are for example the temperature of the burner 81 or the pressure in the humidification unit 10. The fuel value of the anode exhaust gas flow used for heating the burner 81 may also be obtained through a higher fuel concentration in the humidification unit, from a rise in temperature or from an increase in the fuel concentration. To accelerate the start procedure a device may also be provided to feed the waste heat of the burner 81 or its exhaust gas, which flows through the outlet 81a, to suitable heat absorption surfaces on the fuel cell stack 20 and/or the anode fluid unit 10.

FIG. 9 shows a fuel cell system with a special design of the anode supply circulation which is used especially for fuel cells with low output such as 0.1-5 watts. This embodiment maintains a circulation of the anode fluid by means of gas expansion due to a temperature increase and a reduction in volume through cooling. For this purpose, in this embodiment only, a heating appliance 67a is provided as energy consumer which is used to reach the temperature required for the start of operation. Furthermore, a temperature sensor 67b can be used to measure the temperature in the anode fluid unit. The anode fluid unit 10 is supplied via a pipe 90a and in this case the fuel or fuel solution is fed by the principle of communicating pipes.

The fluid pipe between humidification unit 10 and anode chamber 20a contains a one-way valve or a non-return valve V1 which, on account of its material characteristics and design, has a hysteresis in respect of its opening and closing pressure. Provided after the outlet 24 of the anode chamber 20a of a fuel cell 20 is a storage volume 69 which is coupled to the fuel cell 20 by a thermally conducting connection 69a. This is followed by a further one-way valve V2, a heat exchanger W1, a branch 62 with outlet 62b, a pipe to a one-way valve V3 and inlet 13 into the humidification unit 10.

To reach the opening pressure of V1 (opening and closing pressures are e.g. 80 and 20 mbar), the heating appliance 67a is used during the start procedure for heating the gas phase 12 of the humidification unit 10. The fuel-enriched gas flows, after the opening of V1, through the outlet 14 of the humidification unit 10 into the anode chamber 20a. There carbon dioxide is produced from carbon by the anode reaction. Since however, for example if methanol is used for fuel, water vapour is also consumed, the number of particles at the anode outlet 24 decreases compared to the anode inlet 23. An overpressure before valve V2 can therefore be obtained only by increasing the temperature from the waste heat of the anode reaction, which more than compensates for the corresponding drop in pressure due to the reduction in molecules in the anode chamber 20a. During the start procedure the pressure drop is also offset by the inflowing anode fluid from the humidification unit 10. For fuel cells which are unable to produce enough waste heat during the start procedure for a rise in pressure, another heating appliance 69b (shown by broken lines) may be included for the temperature- and pressure rise for starting.

After V1 has closed again and the pressure in the anode chamber 20a or the chamber 69 has increased sufficiently, V2 (opening and closing pressures are e.g. 80 and 20 mbar) is opened and depleted anode fluid reaches the heat exchanger W1. Already cooled fluid flows from the heat exchanger W1 to the branch 62, and a branch flow passes from its opening 62b via the valve V3, which has a very low opening pressure (e.g. 10 mbar), into the upper part of the humidification unit 10. The valve V3 or its connecting pipe can have a suitable flow resistance. The other part flows through the outlet 62c to a one-way valve V4 (opening and closing pressures are e.g. 30 and 20 mbar). This branched partial flow contains the carbon dioxide produced additionally in the anode reaction. As this branch flow still contains fuel it is useable for the heating of gases in the humidification unit 10. For this purpose, this exhaust gas is fed to a suitable catalytic burner 66. The burner 66 is additionally fed with air. The fuel can be oxidised with atmospheric oxygen under heat emission. For the heat transfer into the gas phase 12 of the humidification unit 10, the burner 66 is attached to a device 66a. This device 66a is designed in respect of material, mass and surface for maximum heat emission after the closing of valve V2 or before the opening of valve V1.

As long as V2 and V3 are opened, the anode fluid from the gas storage 69 flows into the heat exchanger W1 and cools down. Already cooled anode fluid flows through V3 into the humidification unit 10. With the outflow into the humidification chamber, the pressure before valve V2 decreases again and V2 closes after the pressure has fallen below the closing pressure.

Due to the heat supply from the heat transfer appliance 66a, the temperature of the anode fluid in the humidification chamber rises and enriches the anode fluid with vapours. Because of the increasing temperature and rising gas volume, pressure in the humidification chamber rises until V1 is opened again and the fuel-enriched anode fluid flows once more into the anode chamber 20a where it is again heated. The system can now supply the fuel cell constantly with enriched anode fluid through the circulation thus created. If, after shutdown of the fuel cell, no more carbon dioxide is produced and therefore no excess anode exhaust gas is delivered to the catalytic burner, the anode fluid unit 10 cools down and the anode circulation stops. In this design of the humidification unit 10 a membrane 65 may also be provided (shown here by broken lines) to separate the liquid fuel phase 11 from the vapour phase 12. This membrane may be made from silicone or a polymer. The enrichment of the anode fluid with fuel can be influenced by this membrane, which can have openings at suitable points for degassing. Instead of a membrane a sponge which absorbs the fuel solution may also be used.

The valve V4 can have a time-limited opening depending on a hysteresis and on pressure fluctuations. However, the valve V4 may also be integrated into the branch 62. This integration can be effected by means of a chamber with three openings (62a, 62b, 62c) and a mobile object like a ball. The chamber can be an upright cylindrical cavity with a slightly larger diameter than the ball. The chamber has an inlet opening 62a at the bottom, the outlet opening 62b at one side and the outlet opening 62c at the top. The ball is pressed upwards by the flow pressure defined through the opening pressure of V2. It closes the passage after anode fluid volume defined by the volume of the cylinder has escaped through the opening 62c. Because of a slight lack of tightness, the ball does not seal the valve seat completely, so that it falls down again on to the opening 62a when the valve V2 is closes again. By this means a defined amount of gas is fed to the burner 66.

The heat exchanger W1 is dimensioned for a cooling capacity which cools the anode fluid below the temperature of the fuel cell solution but is still sufficiently high that only so much thermal energy is withdrawn from the anode fluid that it can be heated by the humidification unit to the appropriate temperature. The heat exchanger may for example be just a metal tube with cooling fins and a large enough volume. To prevent the condensing of vapours in front of the valve V4 or to make more fuel available for the catalytic burner, the heat exchanger can be placed between the branch A1 and the valve V3, or after V3. To increase the volume flow of the anode fluid circulation, another heat exchanger W2 can be placed between valve V1 and the fuel cell 20. To make it possible to influence the circulation pattern, one or more flexible pressure vessels can also be used, which are able to fill up at overpressure and empty with decreasing pressure. Additionally an adjustable heat conductor between fuel cell and humidification unit 10 may be provided to compensate for the enthalpy of evaporation due to the waste heat of the fuel cell.

If enough fuel can be stored at the anode side of the fuel cell, then heat is released at the start of load operation, which induces a pressure rise in the anode chamber 20a and enables the initiation of the circulation. In this case the heating appliance 67a could be omitted. Another start procedure or possible means of heating the anode chamber 20a is also available in systems with active air feeding and in which, on start-up, fuel diffused from the anode chamber 20a to the cathode chamber 20b is oxidised under heat generation.

If, in the case of such low-power systems, low-temperature fuel cells are involved, then the system is so designed that the fuel cell temperature is still higher than that of the anode fluid unit. For this purpose the heat exchanger surfaces W1, W2, 66a and the cooling surfaces of the fuel cell 20 are dimensioned for a temperature increase of the anode fluid by for example 3-20° C. from the reaction exhaust heat of the anode reaction. This temperature increase enlarges the anode fluid volume at the outlet of the anode chamber 24 as compared with the anode fluid flowing into the anode chamber 20a, even in the case that the amount of gas decreases due to the anode reaction.

A further embodiment of a humidification unit 10 according to the invention, which has an especially simple design, will be explained below. This embodiment has a humidification unit in the form of a hollow container with a large base and a relatively flat structure. The container has a gas inlet 13 for the feeding of depleted carrier gas, and a liquid inlet 19 for the feeding of a fuel-containing liquid.

Provided in the liquid inlet 19 is a non-return valve 100 which prevents the liquid from escaping from the container through the liquid inlet 19.

The container has a dome-shaped lid with a fuel outlet 14 in its highest area for the discharge of the fuel-enriched carrier gas.

Due to the large base of the container there is an equal-sized boundary surface between the liquid and the carrier gas. If the container is shaken, waves will be produced in the liquid, which will increase the boundary surface even more. Because of this large boundary surface, humidification takes place with great efficiency.

With the dome-shaped lid there is no risk that, even with liquid moving in the container, liquid will escape through the fuel outlet.

The shape of the container shown in FIG. 10 is designed in such a way that it can be tilted significantly without any unwanted escape of liquid through the inlets or the outlet.

The fill level is set so that the liquid substantially covers the base of the container when the latter is in a horizontal or nearly horizontal position. The fill level should never reach into the area of the dome-shaped concavity of the lid, to ensure that liquid does not escape through the outlet during operation.

This humidification unit can include a tempering device to set the temperature of the liquid at a predetermined level below its boiling point. In this regard, reference is made to the embodiments described above.

In a simple embodiment such a tempering device may be omitted, with only the heat of the depleted carrier gas leaving the fuel cell being used for tempering the liquid. If this is sufficient depends on the application of the fuel cell and the heat contained in the carrier gas. It can be practical to make the container from plastic or another good heat-conducting material. If there is a risk of overheating, means of cooling the container should be provided, for example using an air blower. This air blower would then represent a tempering device.

With the aid of this invention, the complexity of the device for producing a gaseous anode fluid can be kept low, which reduces the volume of the system and the costs of manufacture.

The embodiments depicted serve only to illustrate the invention and its underlying principles. They have therefore no limiting significance. The various process steps and elements described may also be combined in other ways than shown here.

The present invention can also be used for fuel cells which not only convert carbon-containing fuels directly at their anode but also obtain hydrogen within the fuel cell by steam reformation. Such a fuel cell is described for a high-temperature PEMFC in DE 19 945 667 C2.

Furthermore the invention may be used for systems with a solid oxide fuel cell (SOFC) or a molten carbonate fuel cell (MCFC). The application of the fuel supply by the method according to the invention is useful especially for systems with a reformer which is supplied with water vapour and fuel vapour. This principle of supply is also suitable if the hydrogen is produced by internal steam reformation within the fuel cell, for instance with appropriate bi-functional catalysts or additional catalysts.

The new anode supply described here may be used for the depicted fuel cell systems if the fuel is available in liquid form. The invention is particularly suitable for a water soluble fuel and when the anode or the reformer is to be fed with water vapour in addition to gaseous fuel. For this supply device, fuels such as alcohols, carboxylic acids and hydrocarbons are suitable.

The invention may also be operated with other fuels, directly or via reformers, in the fuel cell systems referred to in the patent application.

Furthermore, the humidification unit according to the invention can be used together with evaporators known from the prior art. In this way, an especially high humidification or fuel concentration can be reached. At the same time a certain amount of water or fuel or fuel solution is evaporated additionally before the fuel cell. Since this amount is less than the demand of the cell, the advantages of the humidification unit are still maintained, because it still makes a preconditioned or pre-enriched anode fluid available.

As already explained above, an evaporator may also be used for a less optimal embodiment. In the embodiments explained above, the humidification unit may be replaced by an evaporator. In this case, additional means of controlling and/or regulating the amount of fuel must be provided. These means include for instance sensors for the detection of the fuel concentration in the enriched carrier gas.

The invention claimed is:

1. A humidification unit for supplying carbon dioxide carrier gas containing fuel vapor and water vapor to a fuel cell having an anode and a cathode, comprising:
   a humidification chamber for holding an aqueous liquid containing fuel;
   a first humidification chamber inlet for feeding fuel from a fuel tank into the humidification chamber;
   a second humidification chamber inlet for feeding a carbon dioxide carrier gas, which is formed in the anode, from an anode outlet of the anode into the humidification chamber such that the carbon dioxide carrier gas can contact the aqueous liquid containing fuel so that the carbon dioxide carrier gas is enriched with fuel;
   a humidification chamber outlet for directing the carbon dioxide carrier gas enriched with fuel to an anode inlet of the anode; and
   a control unit for maintaining the aqueous liquid containing fuel in the humidification chamber at a temperature below its boiling point, and said control unit is programmed to regulate the vapor pressures of fuel vapor and water vapor by controlling the fuel concentration, carrier gas volume flow rate, and temperature of the aqueous liquid containing fuel.

2. The humidification unit according to claim 1, wherein the humidification unit has a device for enriching the carbon dioxide carrier gas with fuel or water, or both, comprising a gas inlet terminating in the aqueous liquid containing fuel, a sprinkler to feed the aqueous liquid containing fuel, or a porous humidifying body extending from the area of the aqueous liquid containing fuel into the area of the carbon dioxide carrier gas, or both a sprinkler and a porous humidifying body, wherein by means of the device or increasing a boundary surface, the carbon dioxide carrier gas is enriched with fuel from the aqueous liquid containing fuel.

3. The humidification unit according to claim 1, wherein a tempering device is provided fur the heating and/or cooling of the aqueous liquid containing fuel.

4. A fuel cell unit with the humidification unit according to claim 1, comprising a fuel cell with an anode inlet for the receiving carbon dioxide carrier gas enriched with fuel into the anode and an anode outlet for discharging fuel-depleted carbon dioxide carrier gas from the anode to the second humidification chamber inlet.

5. The fuel cell unit according to claim 4, wherein a reformer is interposed between the humidification chamber outlet and the anode inlet of the fuel cell, said reformer is designed so that the fuel is converted at least partly into hydrogen gas.

6. The fuel cell unit according to claim 4, wherein a control unit is provided to regulate operating parameters of the humidification unit, the fuel cell unit and/or a reformer.

7. The fuel cell unit according to claim 4, wherein tempering device is provided for the heating and/or cooling of the aqueous liquid containing fuel by heat exchange between the fuel cell and the humidification unit.

8. The fuel cell unit according to claim 4, wherein a dosing pump is connected to the first humidification chamber inlet for the feeding of fuel into the humidification chamber.

9. The fuel cell unit according to claim 4, wherein the control unit is so designed that the amount of fuel fed into the humidification chamber is regulated based on fuel cell parameters such as current intensity and/or temperature and/or the fill level in the humidification chamber determined by a level sensor and/or the temperature in the humidification chamber.

10. A process for forming a carbon dioxide carrier gas enriched with fuel and water vapor in a humidification unit, which is partly filled with an aqueous liquid containing fuel, comprising the steps of:

holding the aqueous liquid containing fuel in a humidification chamber at a temperature below its boiling point;

directing a carbon dioxide carrier gas, which is formed in an anode of a fuel cell, into the humidification chamber from an anode outlet of the anode to allow the carbon dioxide carrier gas to contact the aqueous liquid containing fuel to form a carbon dioxide carrier gas enriched with fuel and water; and directing the carbon dioxide carrier gas enriched with fuel and water from the humidification chamber to the anode inlet of the fuel cell, wherein the vapor pressures of fuel vapor and water vapor are regulated by a control unit for balancing the fuel concentration and temperature of the aqueous liquid containing fuel.

11. The process according to claim 10, wherein the carbon dioxide carrier gas is brought into contact with the aqueous liquid containing fuel via a device for enriching the carbon dioxide carrier gas, by which means the carbon dioxide carrier gas is enriched by the containing fuel.

12. The process for the supply of a fuel cell with a fuel-containing carbon dioxide carrier gas using the process according to claim 10, wherein the gaseous fuel-containing carbon dioxide carrier gas is fed to the fuel cell and at least a portion of the carbon dioxide carrier gas depleted in the fuel cell is fed from the fuel cell directly to the humidification unit as carbon dioxide carrier gas, so that the fuel-containing carbon dioxide carrier gas is circulated between the fuel cell and the humidification unit.

13. The process according to claim 10, wherein control of the temperature of the aqueous liquid containing fuel is effected on the basis of at least one of the following parameters: temperature of the aqueous liquid containing fuel, temperature of the fuel cell, humidity of a cathode exhaust gas, proton conductivity of the electrolyte system, fuel concentration in the aqueous liquid containing fuel, initial voltage of the fuel cell or a fuel cell stack, or a control variable derived from the current intensity of the fuel cell.

14. The process according to claim 10, wherein a cathode exhaust gas of the fuel cell is divided into two branch flows and the volume flow rates of the two branch flows are set by means of a control unit depending on fill level and/or the temperature of the humidification chamber, wherein one of the branch flows leaves the system uncooled, and the other branch flow is cooled by means of a heat exchanger, and the condensate of the other branch flow produced during cooling is fed to the humidification unit directly or to a separate chamber for the collection of condensate within the humidification unit.

* * * * *